US010589691B2

(12) United States Patent
Rouleau

(10) Patent No.: US 10,589,691 B2
(45) Date of Patent: Mar. 17, 2020

(54) LADDER RACK AND CABLE CLEAT SYSTEM

(71) Applicant: Panduit Corp., Tinley Park, IL (US)

(72) Inventor: Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/299,979

(22) Filed: Mar. 12, 2019

(65) Prior Publication Data

US 2019/0210539 A1 Jul. 11, 2019

Related U.S. Application Data

(62) Division of application No. 15/402,394, filed on Jan. 10, 2017, now Pat. No. 10,266,122.

(60) Provisional application No. 62/278,237, filed on Jan. 13, 2016.

(51) Int. Cl.
*B65D 63/08* (2006.01)
*B60R 9/048* (2006.01)
*F16B 2/10* (2006.01)
*H02G 3/32* (2006.01)
*B60P 3/00* (2006.01)
*H02G 3/04* (2006.01)

(52) U.S. Cl.
CPC .............. *B60R 9/0485* (2013.01); *B60P 3/00* (2013.01); *F16B 2/10* (2013.01); *H02G 3/32* (2013.01); *B65D 63/08* (2013.01); *H02G 3/0456* (2013.01)

(58) Field of Classification Search
USPC ...... 248/65, 69, 70, 72, 73, 74.1, 74.2, 74.3, 248/228.8, 230.8; 174/68.1, 255, 70 R, 174/74 R
See application file for complete search history.

(56) References Cited

U.S. PATENT DOCUMENTS

| 2,375,513 | A | * | 5/1945 | Bach ...................... F16L 3/221 248/59 |
| 3,559,941 | A | | 2/1971 | Holzman |
| 4,455,011 | A | | 6/1984 | Levine |
| 4,510,650 | A | | 4/1985 | Espinoza |
| 4,679,754 | A | | 7/1987 | Richards |

(Continued)

FOREIGN PATENT DOCUMENTS

| DE | 102008020894 A1 | 12/2009 |
| EP | 2571125 A1 | 3/2013 |

(Continued)

*Primary Examiner* — Alfred J Wujciak
(74) *Attorney, Agent, or Firm* — Christopher S. Clancy; James H. Williams; Aimee E. McVady

(57) ABSTRACT

A cable cleat system that secures cables to a ladder rack. The cable cleat system includes a mounting bracket assembly with a bracket body and a floating support bracket slidably mounted to the bracket body. A metal locking tie is positioned between the floating support bracket and the mounting bracket assembly. The mounting bracket assembly is secured to a ladder rung of the ladder rack and the floating support bracket supports the cables secured to the ladder rack. The metal locking tie wraps around the cables supported by the floating support bracket. The floating support bracket and the metal locking tie slide along the bracket body for enabling thermal expansion and contraction of the cables secured to the ladder rack.

9 Claims, 26 Drawing Sheets

(56) References Cited

U.S. PATENT DOCUMENTS

| | | | |
|---|---|---|---|
| 5,092,553 A | 3/1992 | Joosse et al. | |
| 5,098,054 A | 3/1992 | Dyer | |
| 7,654,492 B2 | 2/2010 | Balderama et al. | |
| 7,861,982 B1* | 1/2011 | McClure | F16L 3/1075 248/229.14 |
| 8,398,033 B2 | 3/2013 | Booth | |
| 8,413,933 B2* | 4/2013 | Benne | F16L 3/11 248/62 |
| 8,757,560 B2 | 6/2014 | Darnell | |
| 9,106,069 B2 | 8/2015 | Frizzell | |
| 9,587,433 B2 | 3/2017 | Sylvester et al. | |
| 2003/0080259 A1 | 5/2003 | Robicheau et al. | |
| 2007/0007398 A1 | 1/2007 | Franks | |
| 2008/0191102 A1 | 8/2008 | Condon et al. | |
| 2009/0294600 A1* | 12/2009 | Dodge | F16L 3/12 248/73 |
| 2013/0047409 A1 | 2/2013 | Booth | |
| 2014/0239131 A1 | 8/2014 | Sylvester et al. | |
| 2014/0325799 A1* | 11/2014 | Frizzell | H02G 3/32 24/16 R |
| 2014/0346291 A1 | 11/2014 | Booth | |
| 2015/0275578 A1 | 10/2015 | Sylvester et al. | |

FOREIGN PATENT DOCUMENTS

| | | |
|---|---|---|
| EP | 2955803 A1 | 12/2015 |
| GB | 2031507 A | 4/1980 |
| GB | 2339237 B | 6/2001 |
| GB | 2389970 A | 12/2003 |
| GB | 2473492 A | 3/2011 |
| WO | 9849484 A1 | 11/1998 |
| WO | 2015183672 A1 | 3/2015 |

* cited by examiner

LADDER RACK AND CABLE CLEAT SYSTEM

CROSS REFERENCE TO RELATED APPLICATIONS

This application is a divisional of U.S. patent application Ser. No. 15/402,394, filed Jan. 10, 2017, which claims priority to U.S. Provisional Application No. 62/278,237, filed Jan. 13, 2016, the subject matter of which is hereby incorporated by reference in its entirety.

FIELD OF THE INVENTION

The present invention relates to cables secured to a ladder rack, and more particularly to a cable cleat system for ladder racks that allows for thermal expansion and contraction of cables secured to the ladder rack.

BACKGROUND OF THE INVENTION

Brackets and straps are typically used to secure cables to ladder racks for short circuit protection or general fastening. A common problem occurs when the cables attached to ladder racks expand or contract. The cables move and as a result the connection between the cables and the ladder rack is often broken or damaged.

Therefore, it is desirable to improve the connection of the cables to the ladder racks to allow the cables to expand and contract thereby reducing the forces that build within the cables and eliminating damage to the cables and the ladder rack.

SUMMARY OF THE INVENTION

A cable cleat system designed to secure cables to a ladder rack. The cable cleat system includes a mounting bracket assembly with a bracket body and a floating support bracket slidably mounted to the bracket body. The mounting bracket assembly is secured to a ladder rung of the ladder rack. A metal locking tie is positioned between the floating support bracket and the mounting bracket assembly. The metal locking tie wraps around the cables support by the floating support bracket to secure the cables to the ladder rack. The floating support bracket and the metal locking tie slide along the bracket body for enabling thermal expansion and contraction of the secured cables.

An alternative cable cleat system designed to secure cables to a ladder rack. The cable cleat system includes a mounting bracket assembly having a bracket body and a cable cleat slidably mounted to the bracket body. The mounting bracket assembly is secured to a ladder rung of the ladder rack. The cable cleat includes a base and a cover hingedly attached to the base. Cable are positioned on the base of the cable cleat and the cover of the cable cleat confines the cables to secure the cables to the ladder rack. The cable cleat slides along the bracket body for enabling thermal expansion and contraction of the secured cables.

DETAILED DESCRIPTION

Figure 1:
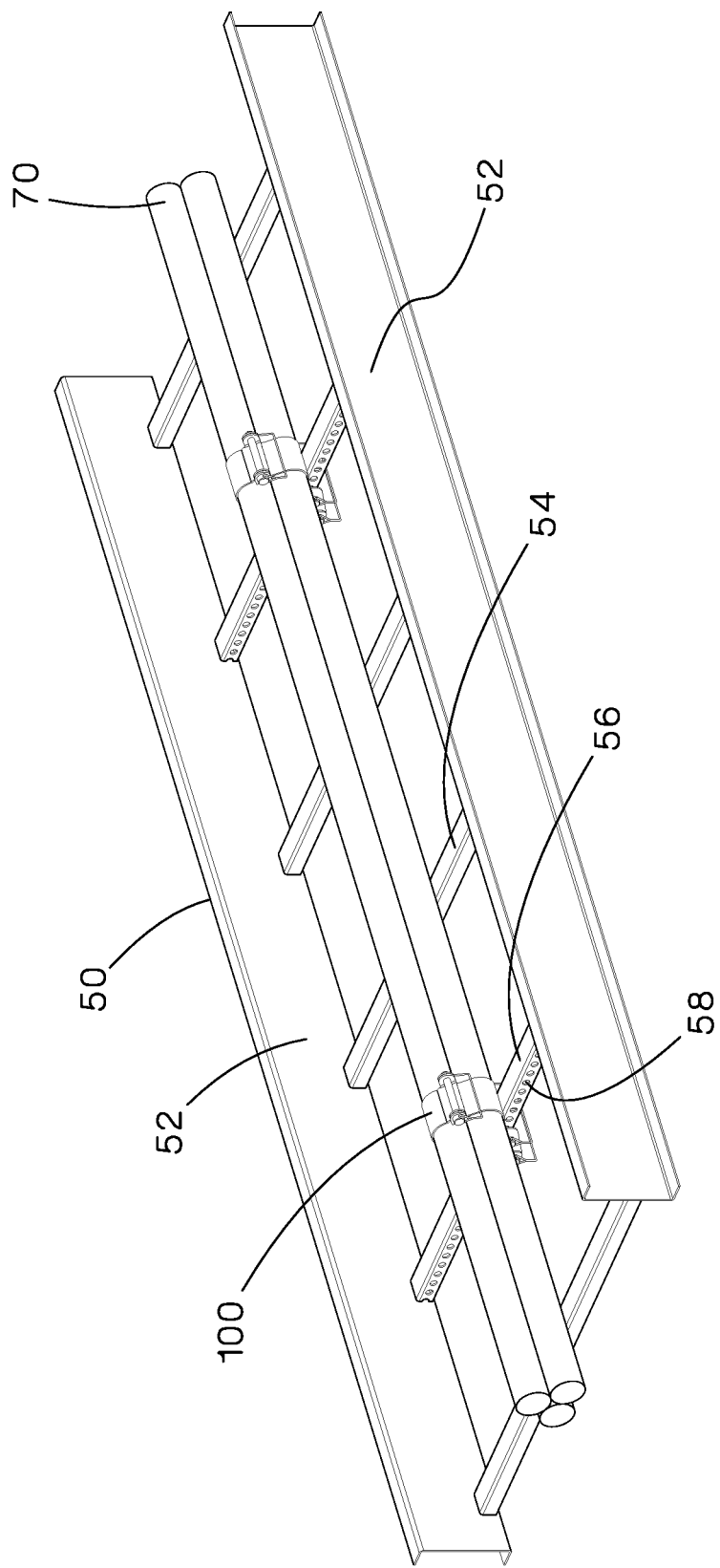
FIG. 1 is a perspective view of a ladder rack and the cable cleat system of the present invention.

The present invention is a ladder rack and cable cleat system that allows for thermal expansion or contraction of cables that are attached to the ladder rack. FIG. 1 illustrates a ladder rack 50 with ladder rack side rails 52 and ladder rungs 54, 56 that are positioned between the side rails 52 at specified intervals to form the ladder rack 50. As illustrated in FIG. 1, every third rung of the ladder rack 50 is a perforated rung 56 with the sides of the ladder rung having aligned holes 58. As described below, the aligned holes 58 receive the cable cleats 100 that are designed to secure cables 70 to the ladder rack 50.

Figure 2:
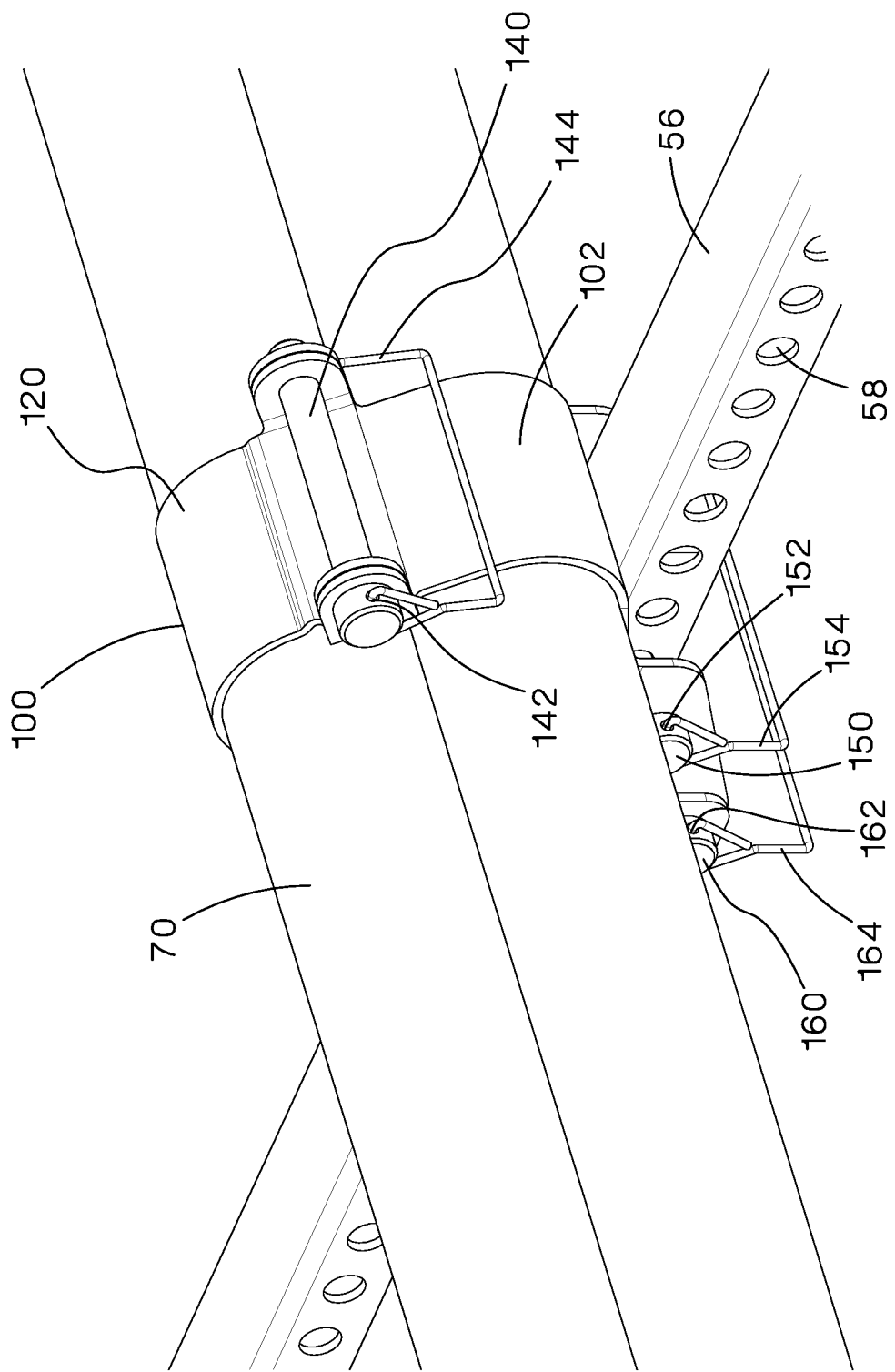
FIG. 2 is a perspective view of a cable cleat installed on a perforated ladder rung of FIG. 1.
Figure 3:
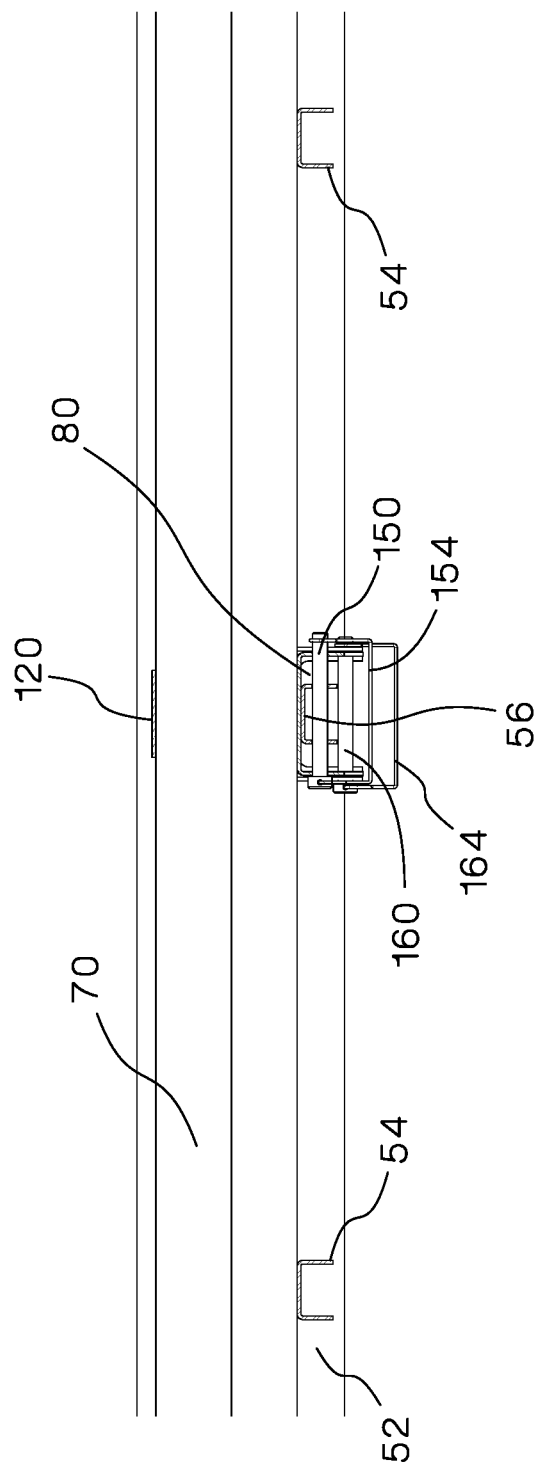
FIG. 3 is a right cross sectional view of the ladder rack and cable cleat of FIG. 1 with a ladder rack side rail removed.
Figure 4:
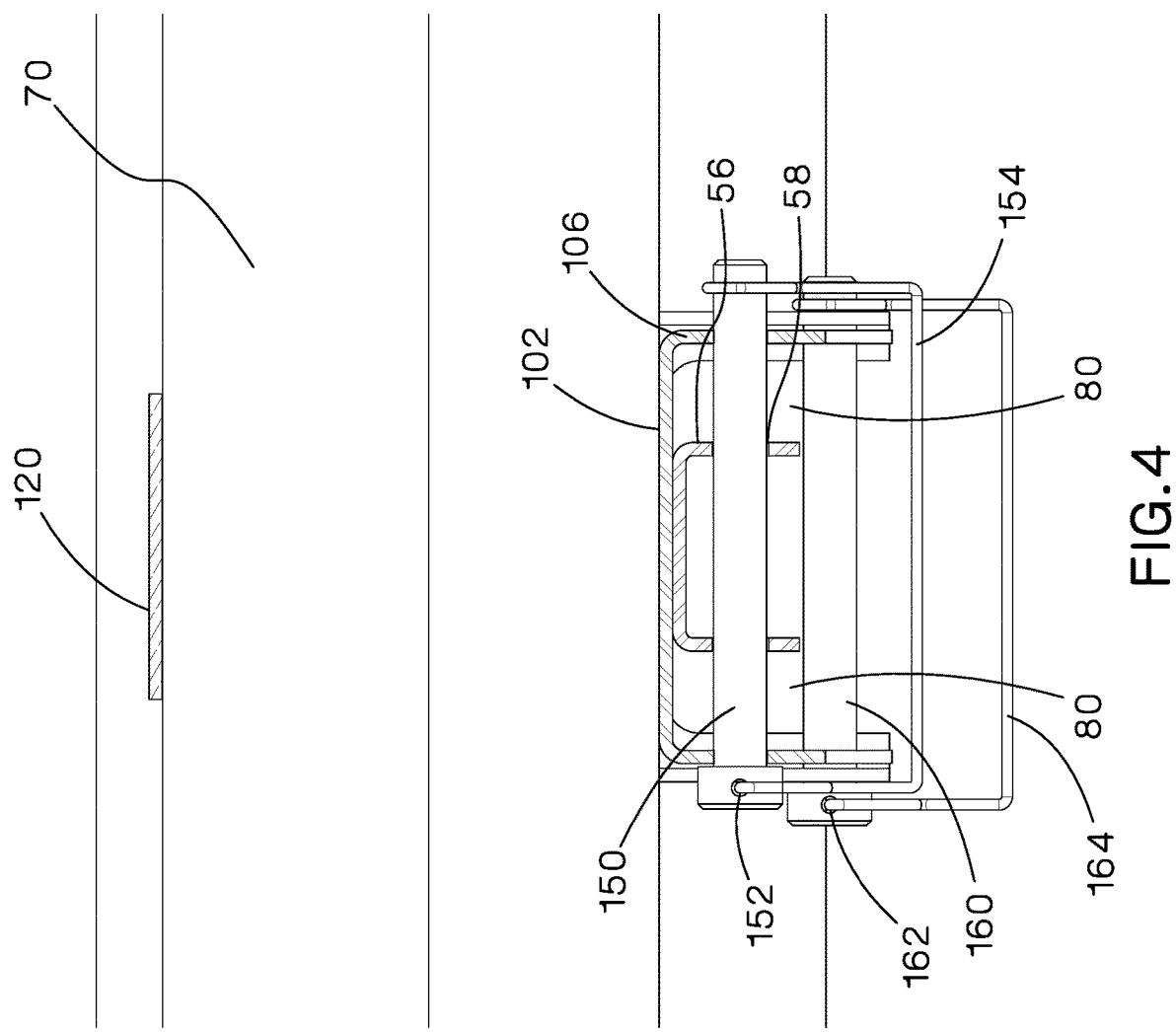
FIG. 4 is a right cross sectional view of the cable cleat installed on the perforated ladder rung of FIG. 3.

FIGS. 2-4 illustrate a cable cleat 100 of the present invention securing cables 70 to a perforated ladder rung 56 of the ladder rack 50. As illustrated in FIG. 3, each perforated rung 56 is positioned lower than the non-perforated rungs 54 to enable the cable cleat 100 to be inserted under the cables resting on the ladder rack 50 without lifting the cables 70. As a result, the cable cleats 100 are easy and quick to install.

As illustrated in FIG. 4, the cable cleat 100 is wider than the perforated ladder rung 56. As a result, there are open spaces 80 on both sides of the ladder rung 56. The open spaces 80 provide compensation for thermal expansion by allowing the cable cleat 100 to slide on the ladder rung 56, when necessary.

Figure 5:
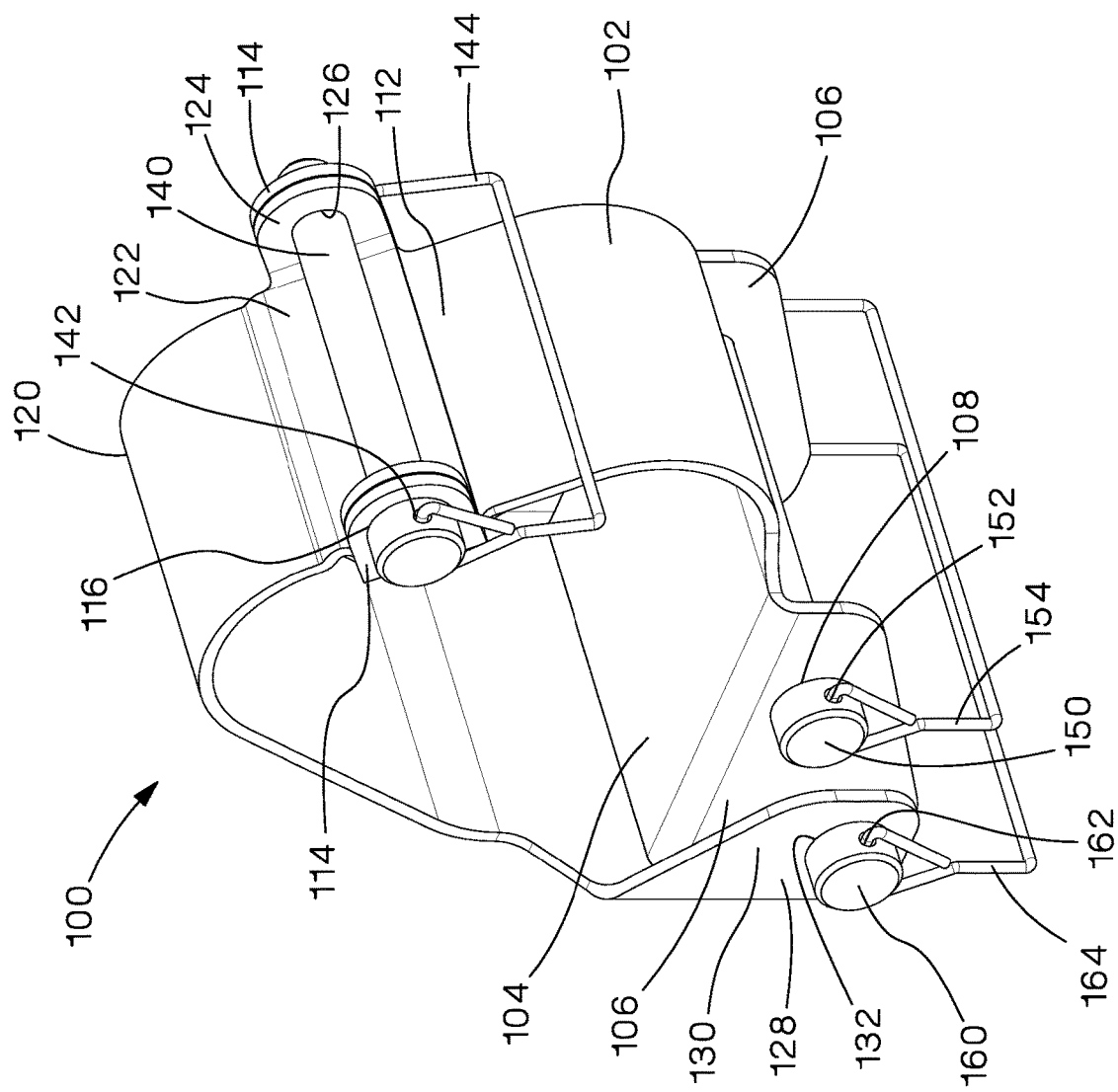
FIG. 5 is a perspective view of the cable cleat of FIG. 1.

As illustrated in FIG. 5, the cable cleat 100 includes a cable cleat base 102, a cable cleat cover 120, and three pins 140, 150, 160 with keeper wires 144, 154, 164, respectively. Each pin performs a different function to secure the cable cleat 100. The cable cleat hinge pin 140 pivotally connects the cable cleat cover 120 to the cable cleat base 102. The cable cleat attaching pin 150 secures the cable cleat 100 to the perforated ladder rung 56. The cable cleat locking pin 160 secures the cable cleat cover 120 over cables 70. The keeper wires 144, 154, 164 protect against vibrations and prevent the pins 140, 150, 160, respectively, from sliding out of position. The keeper wires 144, 154, 164 act as a typical cotter pin. The keeper wires anchor the cable cleat pins by being inserted through a hole in the cable cleat pin shaft and then spread to hold the cable cleat pin in position.

The cable cleat base 102 includes a first end 104 designed to slide under the cables 70 resting on the perforated ladder rung 56 and a second end 112. The first end 104 of the cable cleat base 102 includes two downwardly extending base flanges 106. One of the base flanges 106 is positioned on either side of the first end 104 of the cable cleat base 102. Each base flange 106 includes two holes 108, 110 for receiving the cable cleat attaching pin 150 and the cable cleat locking pin 160, respectively. The second end 112 of the cable cleat base 102 also includes two flanges 114 positioned on either side of the second end 112 of the cable cleat base 102. Each flange 114 includes a hole 116 for receiving the cable cleat hinge pin 140.

The cable cleat cover 120 includes a first end 122 with two flanges 124 and a second end 128 with two flanges 130. The flanges 124 at the first end 122 of the cable cleat cover 120 are positioned on each side of the cable cleat cover 120 and each flange 124 includes a hole 126 for receiving the cable cleat hinge pin 140. As illustrated in FIGS. 2 and 5-7, the first end 122 of the cable cleat cover 120 is pivotally connected to the second end 112 of the cable cleat base 102 via the cable cleat hinge pin 140. The cable cleat hinge pin 140 is locked in position by the keeper wire 144 that is inserted in holes 142 in the cable cleat hinge pin 140 to hold the base 102 and cover 120 together. The flanges 130 at the second end 128 of the cable cleat cover 120 are positioned on each side of the cable cleat cover 120 and each flange 130 includes a hole 132 for receiving the cable cleat locking pin 160.

Figure 6:
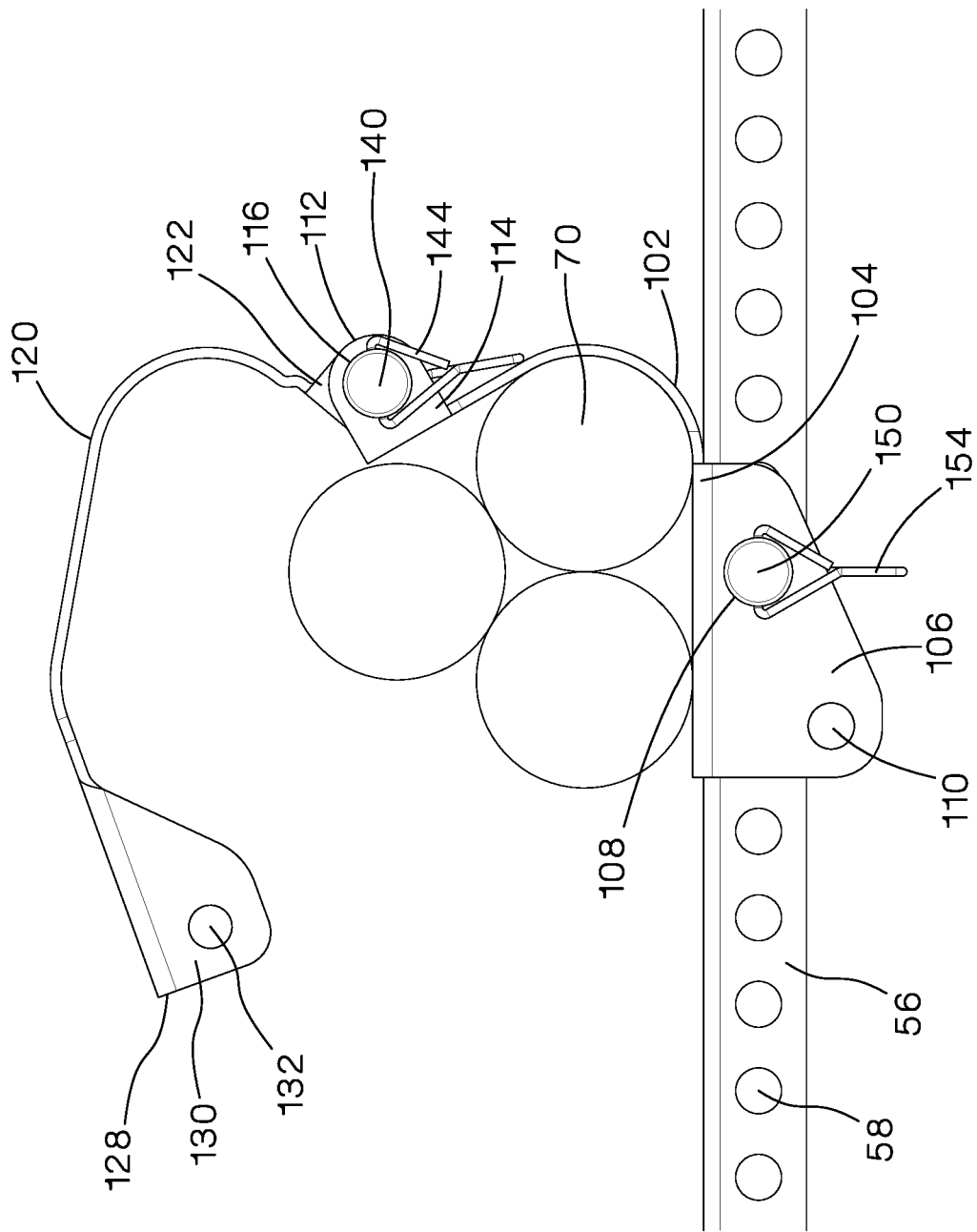
FIG. 6 is a front view of the cable cleat of FIG. 2 partially installed around a cable bundle positioned on a perforated ladder rung.
Figure 7:
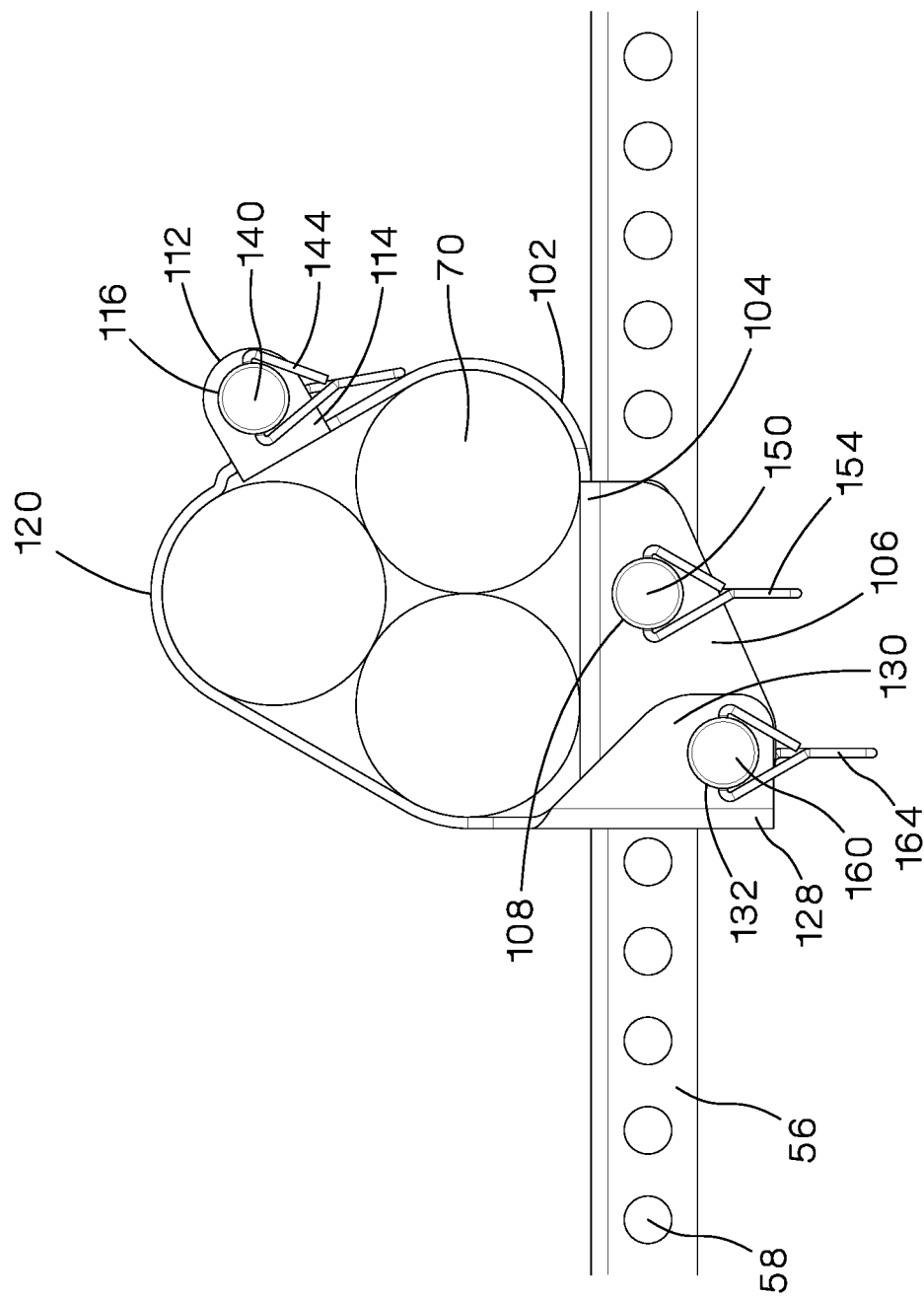
FIG. 7 is a front view of the cable cleat of FIG. 2 installed around a cable bundle positioned on a perforated ladder rung.
Figure 8:
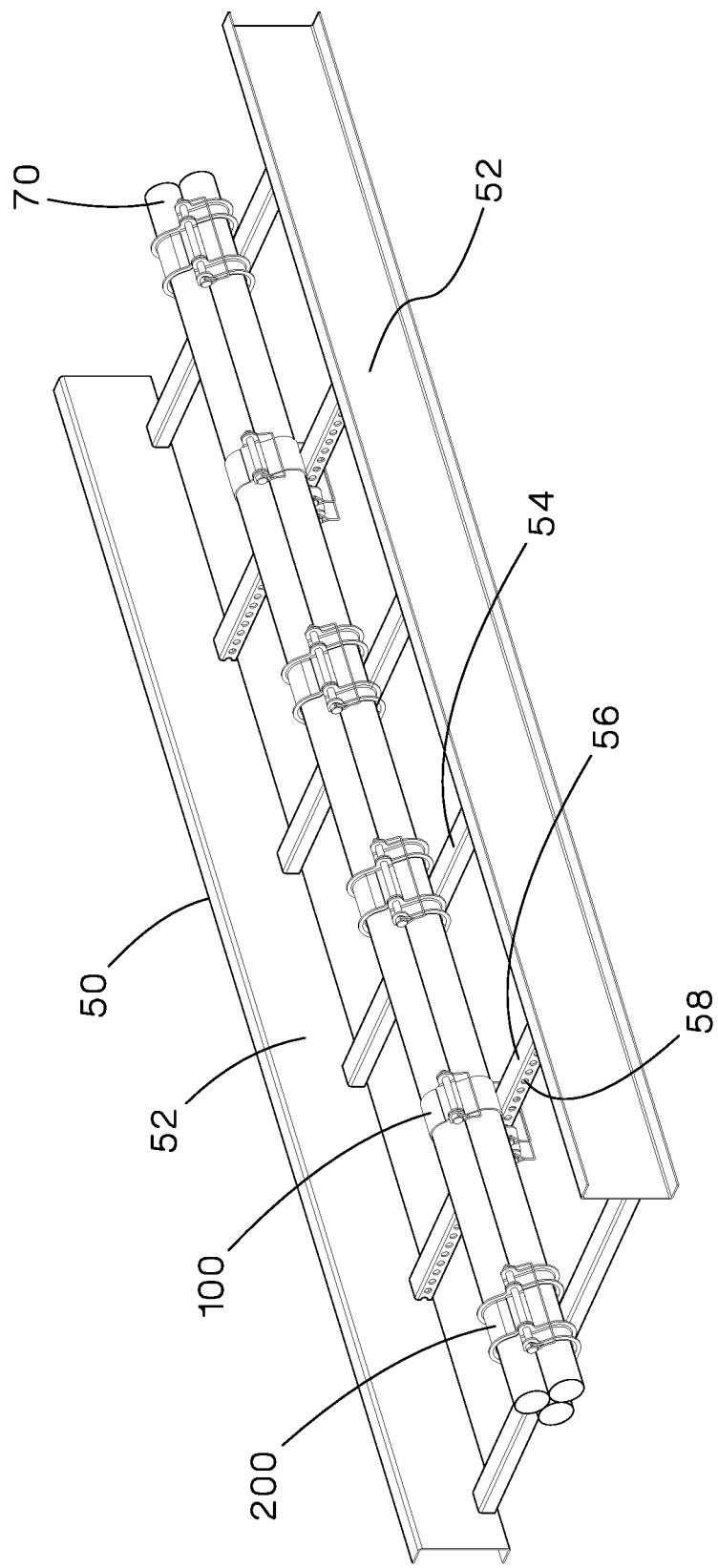
FIG. 8 is a perspective view of a ladder rack and an alternative embodiment of the cable cleat system of the present invention.

FIGS. 6 and 7 illustrate the installation of the cable cleat 100 on a perforated ladder rung 56 over cables 70. The cable cleat 100 is installed around the cables 70 with the cable cleat cover 120 pivoted upward. After sliding the cable cleat base 102 under the cables 70 resting on the perforated ladder rung 56, the cable cleat attaching pin 150 is inserted through the hole 108 in one of the base flanges 106, through the aligned holes 58 in the perforated rung 56, and through the hole 108 in the second base flange 106. The cable cleat attaching pin 150 is locked in position by the keeper wire 154 that is inserted in holes 152 in the cable cleat attaching pin 150 to hold the cable cleat 100 together. The cable cleat attaching pin 150 prevents lateral movement along the ladder rung 56.

Next, the cable cleat cover 120 is pivoted downward around the cables 70 to confine the cables 70. Once the cable cleat cover 120 is fully closed, the cable cleat locking pin 160 is inserted through the hole 132 in one of the flanges 130 at the second end 128 of the cable cleat cover 120, the holes 110 in the flanges 106 at the first end 104 of the cable cleat base 102, and through the hole 132 in the flange 130 at the opposite side of the second end 128 of the cable cleat cover 120. The cable cleat locking pin 160 is secured in position by the keeper wire 164 that is inserted in holes 162 in the cable cleat locking pin 160 to hold the cable cleat 100 together.

The cable cleat system described with respect to FIGS. 1-7 may be installed without lifting the cables 70 only on every third perforated ladder rung 56 of the ladder rack 50. FIGS. 8-14 illustrates an alternative cable cleat system with the cable cleat 100 secured to the perforated ladder rungs 56 and cable cleat 200 used to secure the cables to the non-perforated ladder rungs 54. While only one bundle of cables is illustrated, it is contemplated that multiple bundles of cable may be installed on the ladder rack of the present invention.

Figure 9:
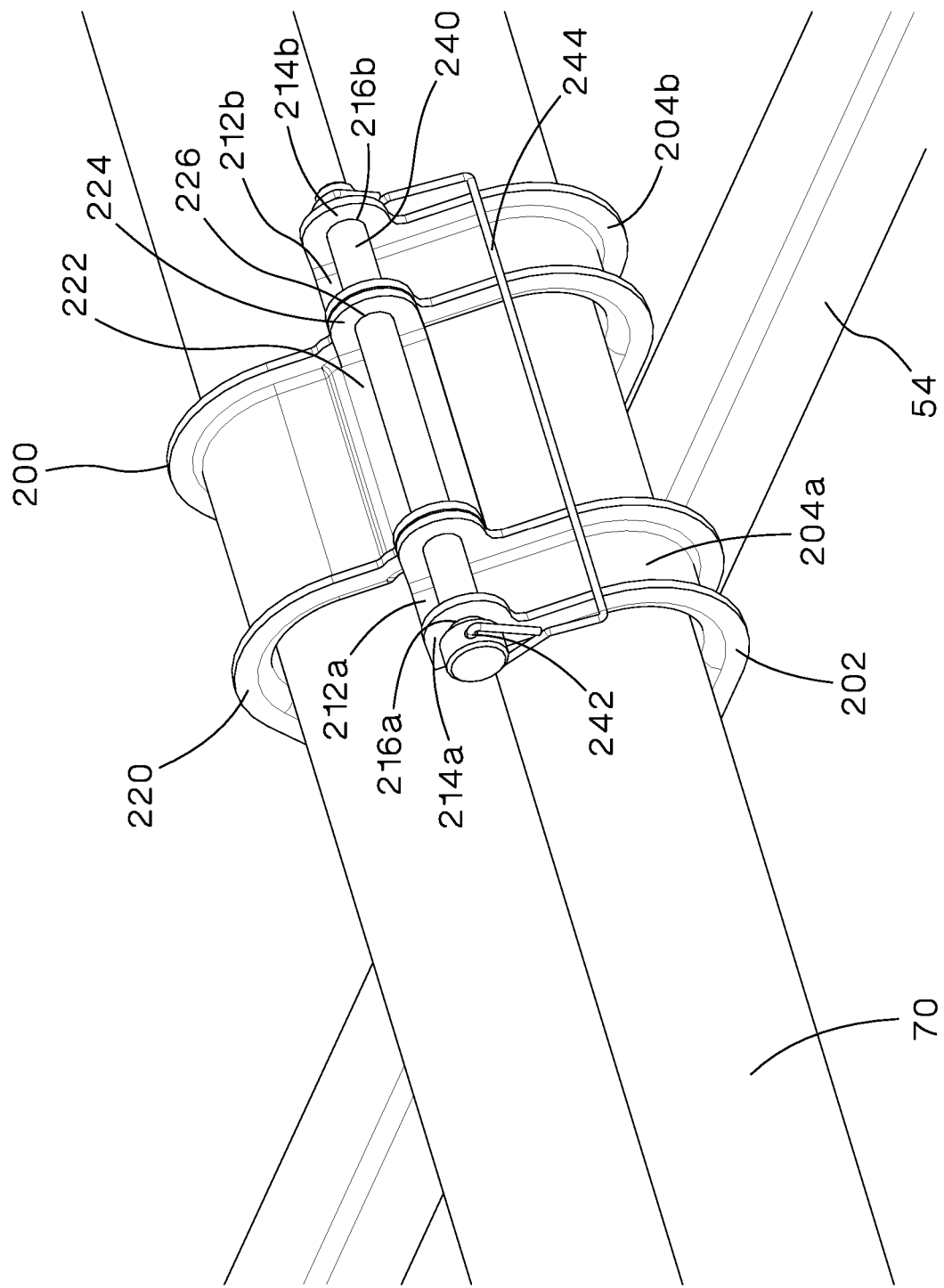
FIG. 9 is a perspective view of a cable cleat installed on a non-perforated ladder rung of FIG. 8.
Figure 10:
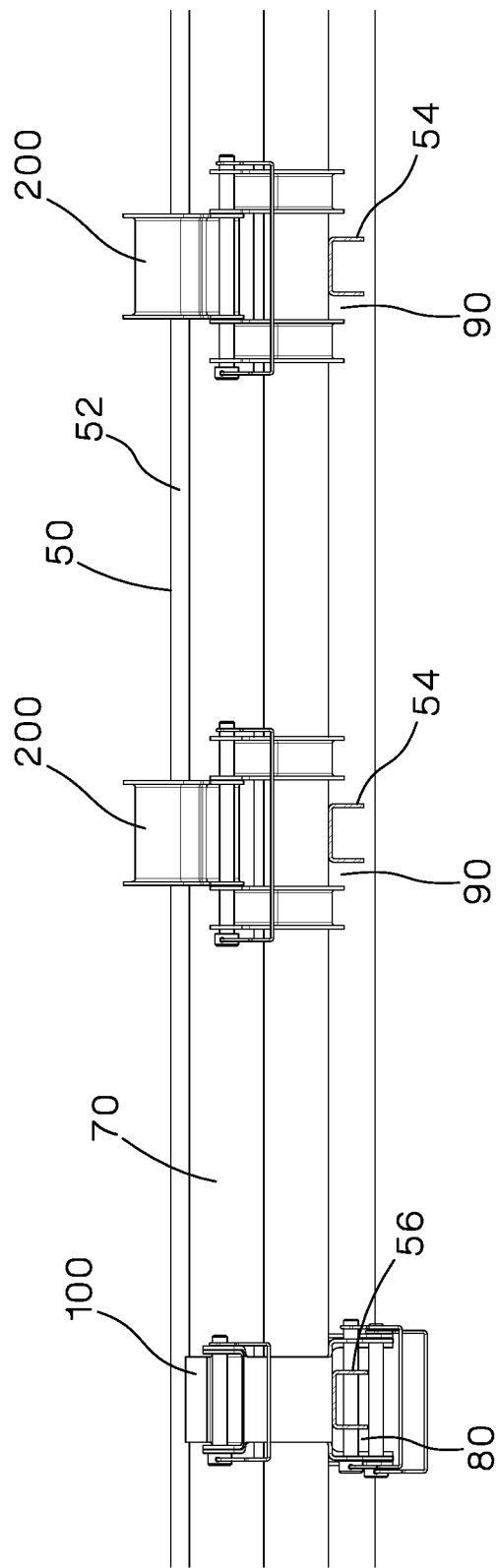
FIG. 10 is a right side view of the ladder rack and cable cleat system of FIG. 8 with a ladder rack side rail removed.
Figure 11:
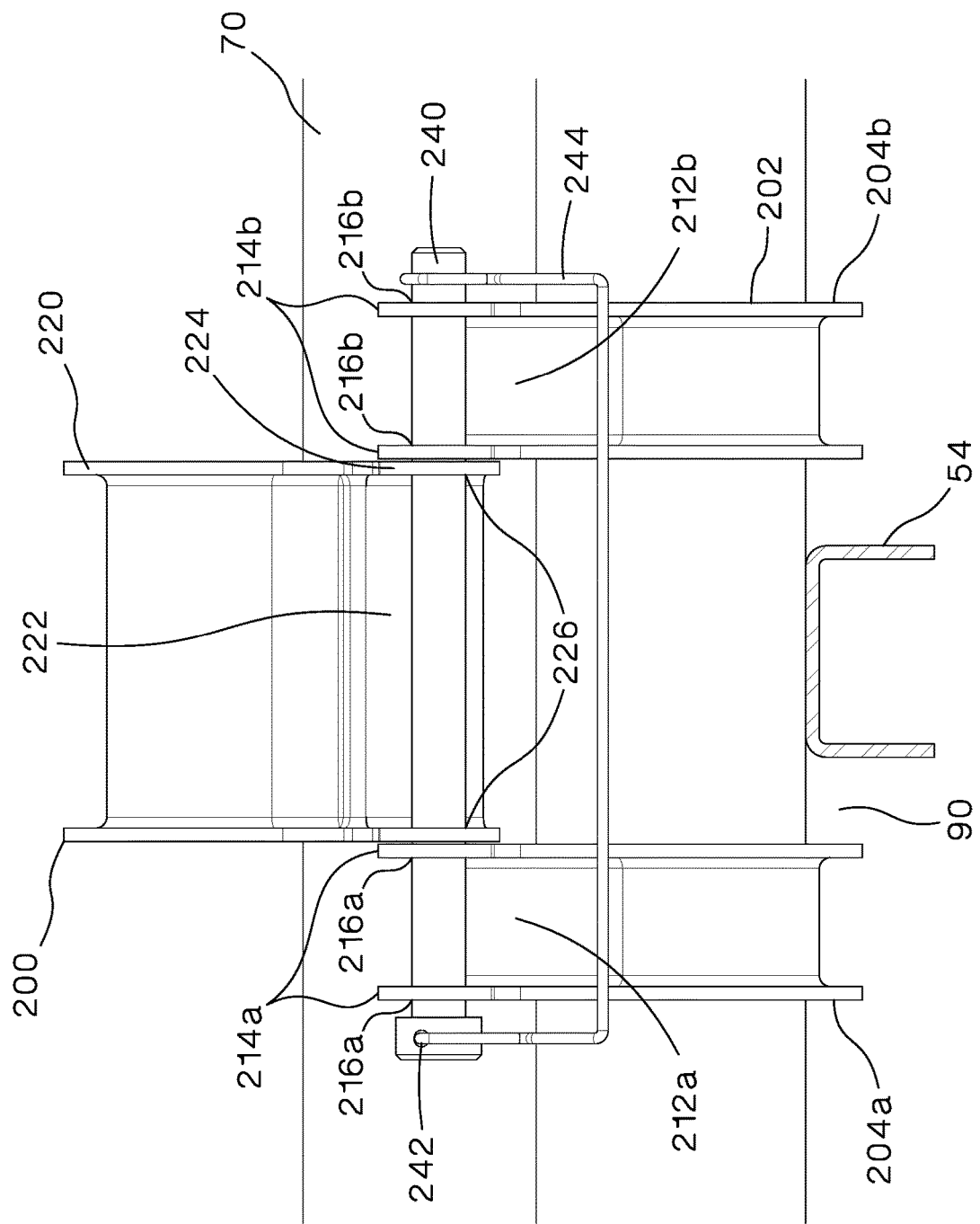
FIG. 11 is a right side view of the cable cleat installed on the non-perforated ladder rung of FIG. 9.

As illustrated in FIGS. 9-11, the cables 70 rest directly on the non-perforated ladder rungs 54. The cable cleat 200 is designed to wrap around the cables 70 without lifting the cables 70 off of the ladder rung 54. As described below, the cable cleat 200 includes a base 202 that is split in two members 204a, 204b to allow insertion of the cable cleat base 202 under the cables 70 resting on the ladder rungs 54 without lifting the cables 70. As a result, the cable cleat 200 is easy and quick to install. As illustrated in FIGS. 10-11, when the cable cleat 200 is installed on the ladder rung, there are open spaces 90 on both sides of the ladder rung 54. The open spaces 90 provide compensation for thermal expansion by allowing the cable cleat 200 to slide on the ladder rung 54, when necessary.

Figure 12:
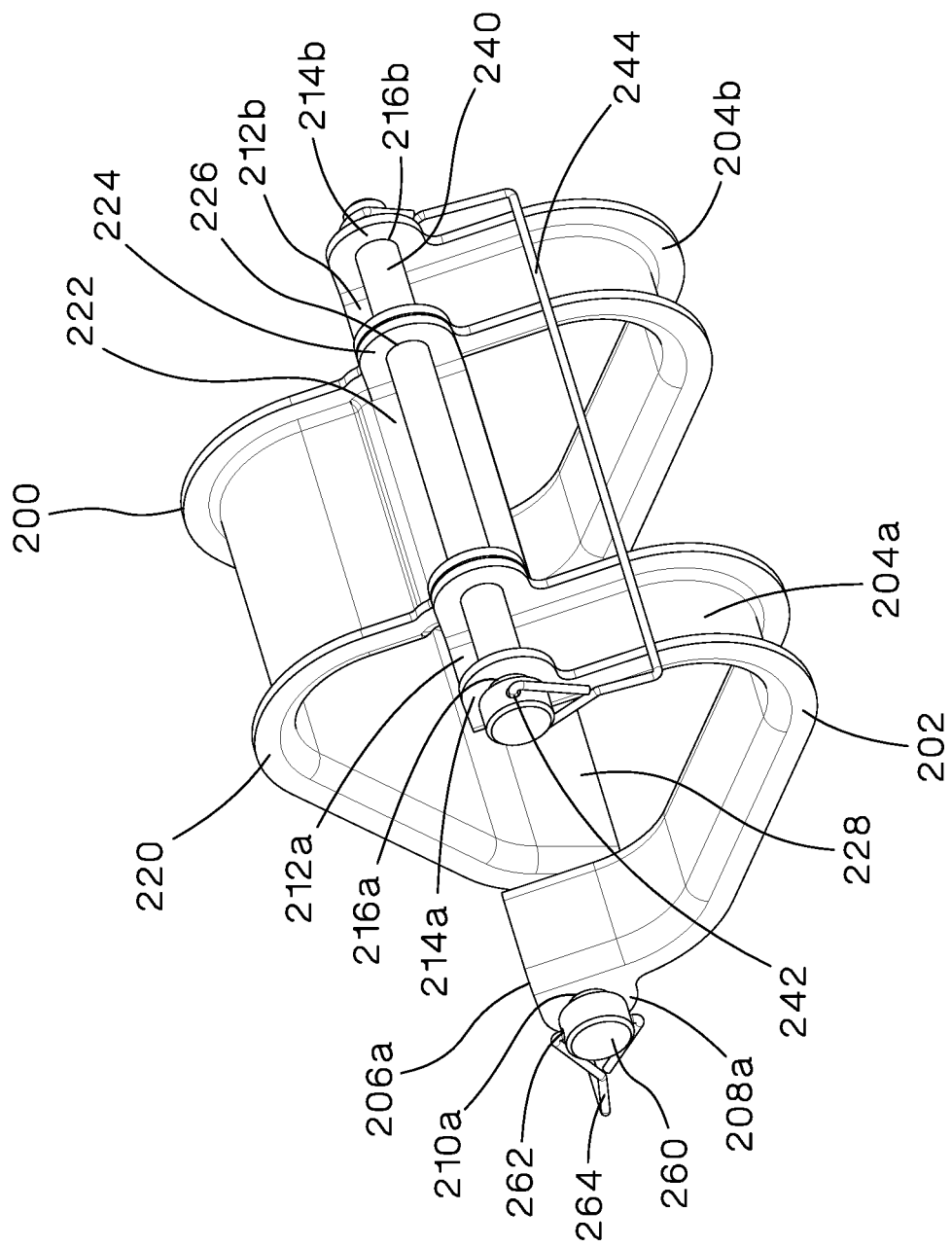
FIG. 12 is a perspective view of the cable cleat of FIG. 9.
Figure 13:
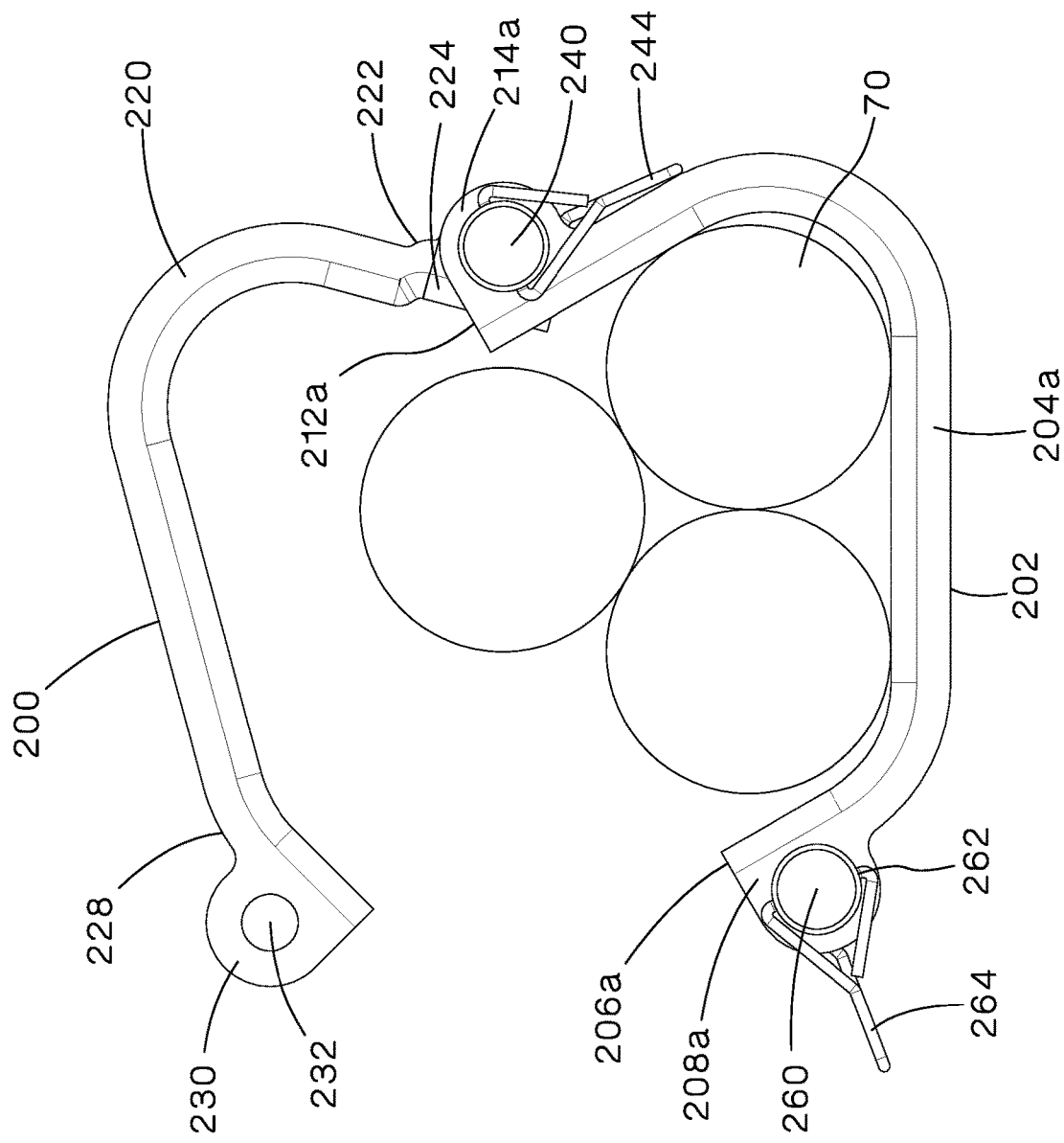
FIG. 13 is a front view of the cable cleat of FIG. 12 partially installed around a bundle.
Figure 14:
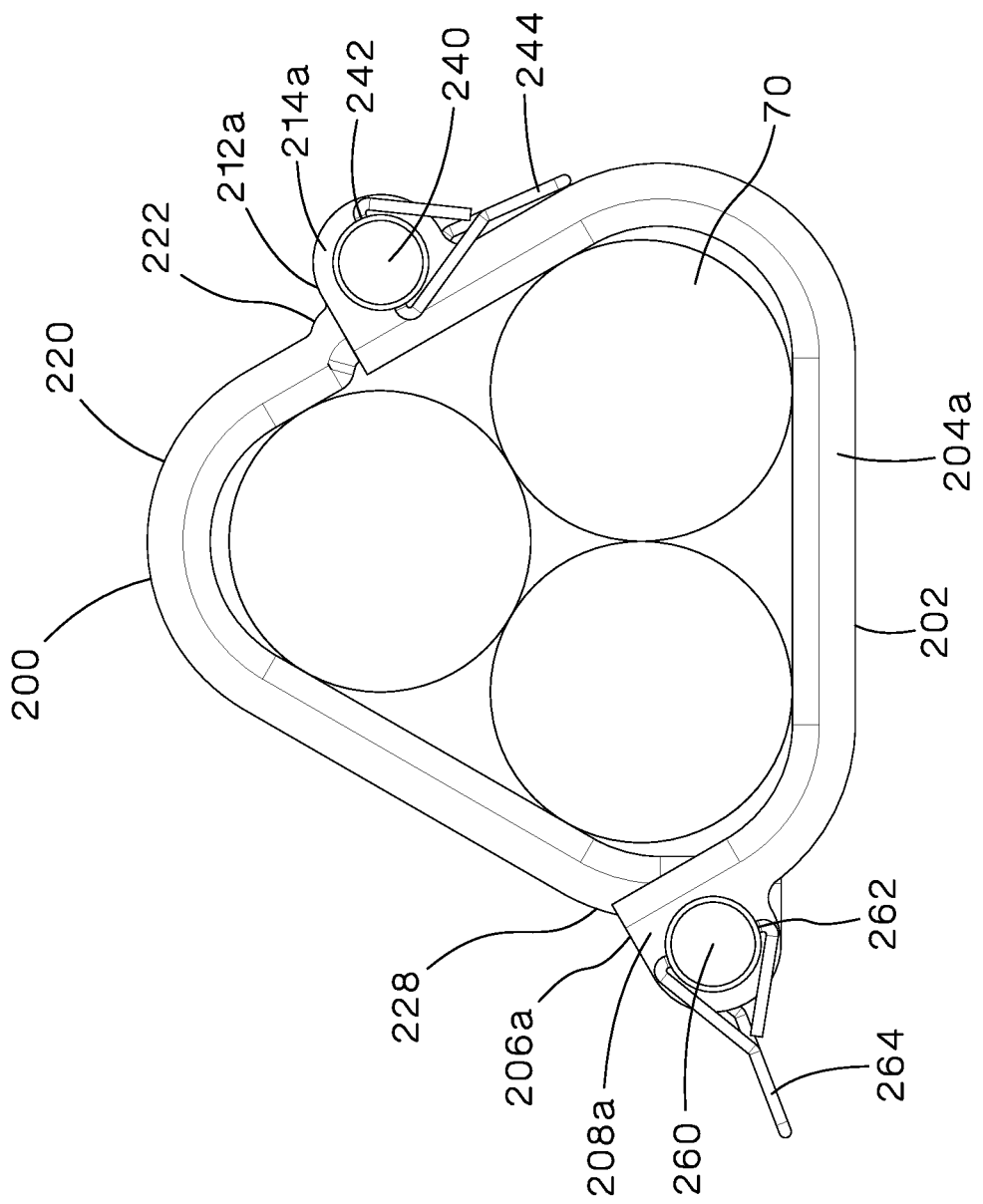
FIG. 14 is a front view of the cable cleat of FIG. 12 installed around a bundle.
Figure 15:
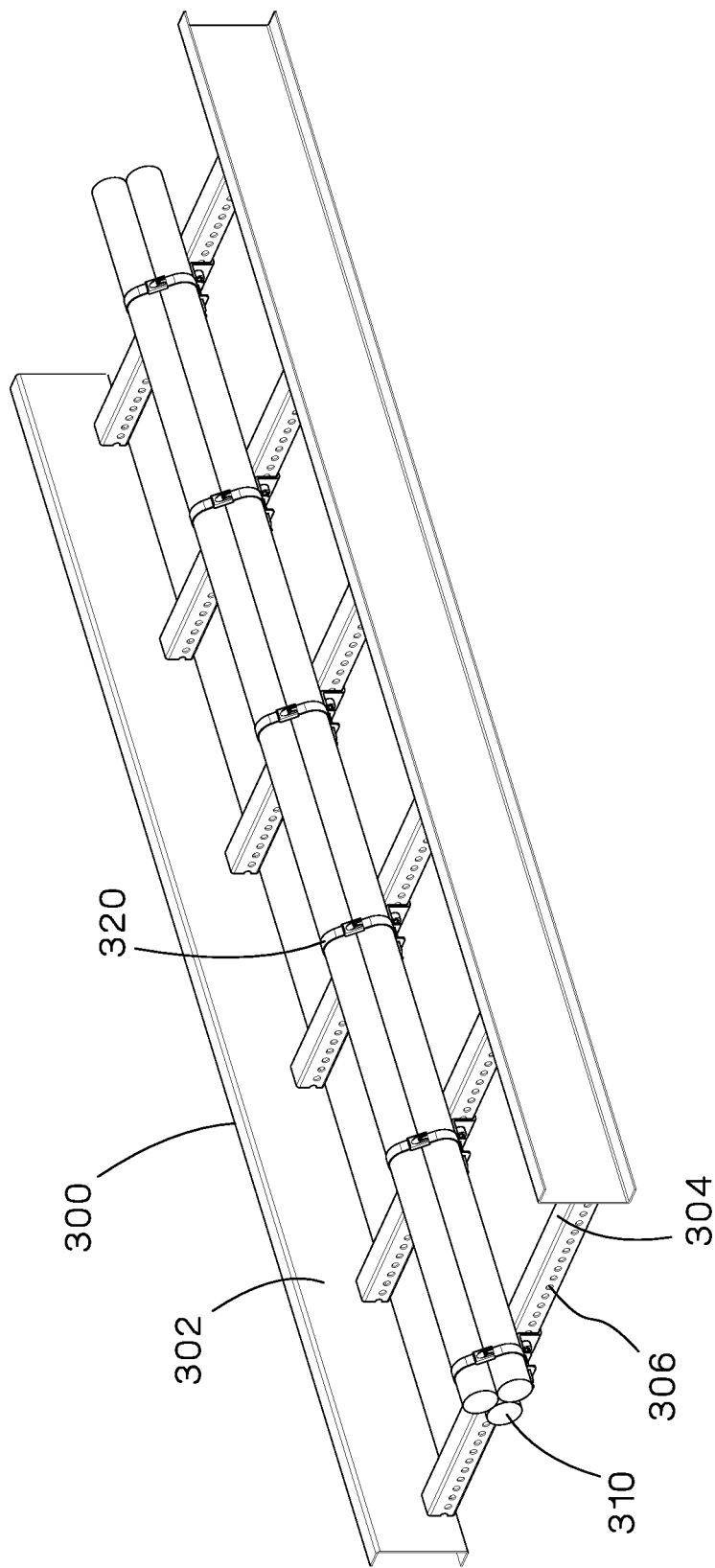
FIG. 15 is a perspective view of an alternative ladder rack and cable cleat system.
Figure 16:
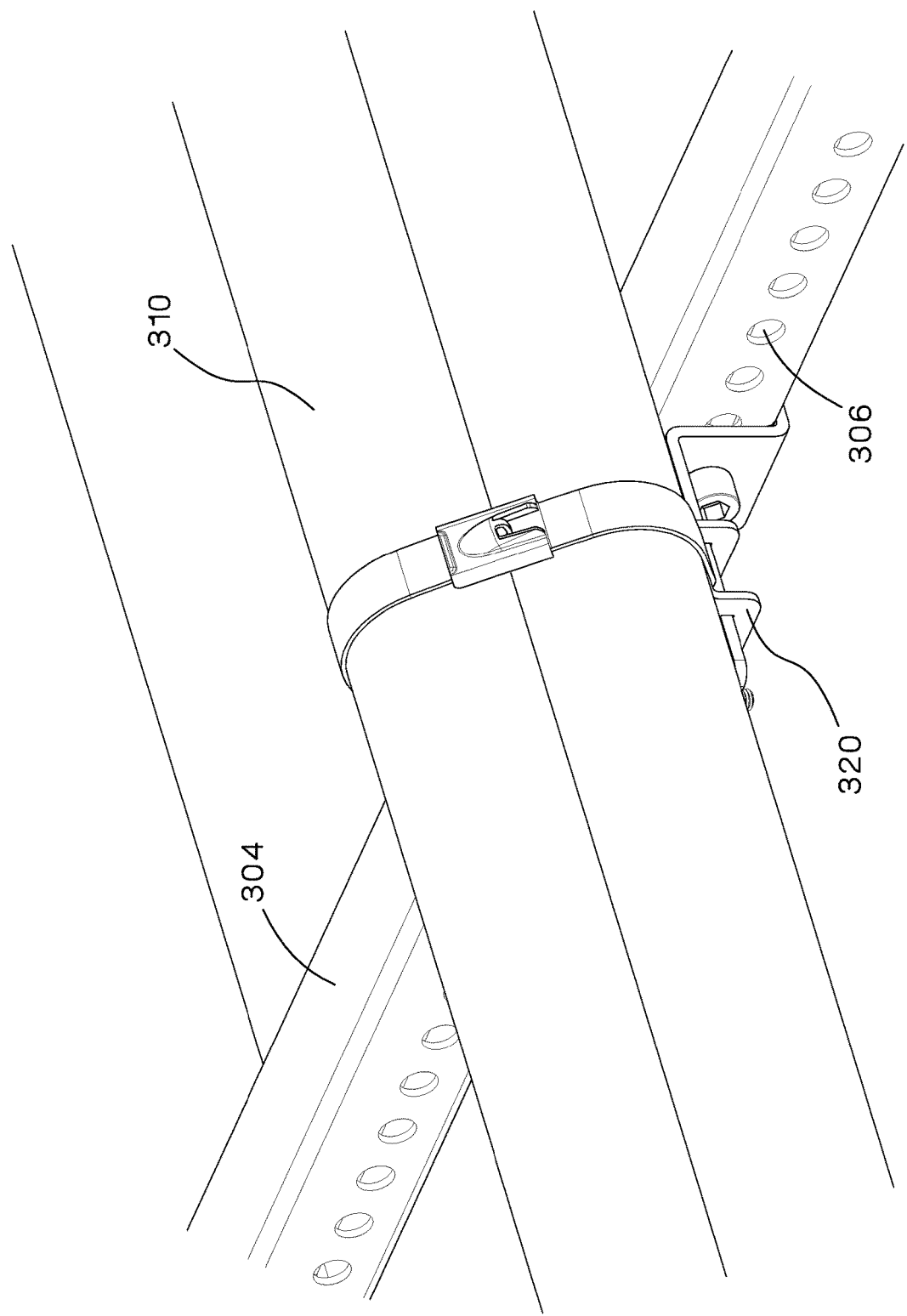
FIG. 16 is a perspective view of a cable cleat installed on a perforated ladder rung of FIG. 15.
Figure 17:
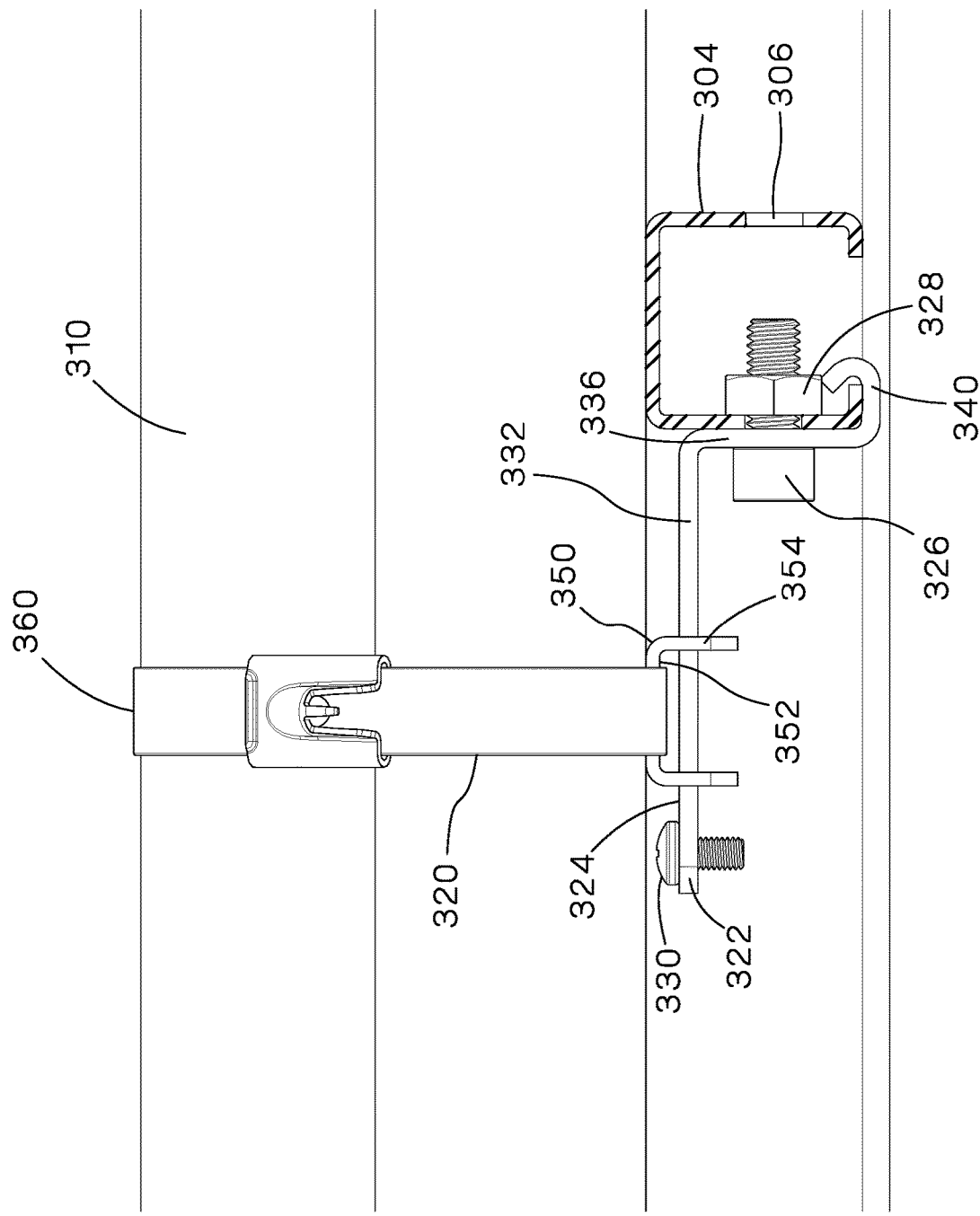
FIG. 17 is a right side view of the ladder rack and cable cleat of FIG. 15 with a ladder rack side rail removed.

The cable cleat 200 is illustrated in more detail in FIGS. 12-14. The cable cleat 200 includes a base 202, a cover 220 and two pins 240, 260 with keeper wires 244, 264, respectively. Each pin 240, 260 performs a different function to secure the cable cleat 200. The cable cleat hinge pin 240 pivotally connects the cable cleat cover 220 to the cable cleat base 202. The cable cleat locking pin 260 secures the cable cleat cover 220 over the cables 70. The keeper wires 244, 264 protect against vibrations and prevent the cable cleat hinge pin 240 and the cable cleat locking pin 260, respectively, from sliding out of position.

The cable cleat base 202 includes two base members 204a, 204b spaced apart with each base member 204a, 204b having a first end 206a, 206b and a second end 212a, 212b. The first ends 206a, 206b of the base members 204a, 204b have a pair of flanges 208a, 208b with a center opening 210a, 210b for receiving the cable cleat locking pin 260. The second ends 212a, 212b of the base members 204a, 204b have a pair of flanges 214a, 214b with a center opening 216a, 216b for receiving the cable cleat hinge pin 240. Similarly, the cable cleat cover 220 includes a first end 222 and a second end 228. The first end 222 of the cable cleat cover 220 includes a pair of flanges 224 with a center hole 226 for receiving the cable cleat hinge pin 240. As illustrated in FIG. 12, the first end 222 of the cover 220 is positioned between the second ends 212a, 212b of the base members 204a, 204b. The center holes 216a, 216b in the flanges 214a, 214b of the second end 212a, 212b of the base members 204a, 204b and the center holes 226 in the flanges 224 of the first end 222 of the cover 220 align to receive the cable cleat hinge pin 240. The cable cleat hinge pin 240 is secured in position by the keeper wire 244 that is inserted in holes 242 in the hinge pin 240 to hold the cable cleat together.

The second end 228 of the cover 220 includes a pair of flanges 230 with a center hole 232 for receiving the cable cleat locking pin 260. The second end 228 of the cover 220 is positioned between the first ends 206a, 206b of the base members 204a, 204b. The center holes 210a, 210b in the flanges 208a, 208b of the first end 206a, 206b of the base members 204a, 204b and the center holes 232 in the flanges 230 of the second end 228 of the cover 220 align to receive the cable cleat locking pin 260.

To install the cable cleat 200 around cables 70 on the ladder rack 50, the base members 204a, 204b of the cable cleat 200 slide under the cables 70 resting on a non-perforated ladder rung 54 with the cable cleat cover 220 pivoted upward. The cable cleat cover 220 is pivoted downward to a closed position (see FIG. 14) to confine the cables 70. Once the cable cleat cover 220 is positioned around the cables 70, the locking pin 260 is inserted through the flanges 208a, 208b of the first end 206a, 206b of the base members 204a, 204b and the flanges 230 of the second end 228 of the cable cleat cover 220. The cable cleat locking pin 260 is secured in position by the keeper wire 264 that is inserted in holes 262 in the locking pin 260 to hold the cable cleat together. As a result, the cable cleat 200 is locked on the cables 70 positioned on the non-perforated ladder rung 54.

FIGS. 15-19 illustrate an alternative ladder rack 300 and cable cleat system 320 that allows the thermal expansion and contraction of cables 310 secured to the ladder rack 300. The alternative system includes a ladder rack 300 with two ladder rack side rails 302 and a plurality of perforated ladder rungs 304 with the sides of the ladder rung 304 having aligned holes 306. The perforated ladder rungs 304 are positioned between the ladder rack side rails 302. The perforated ladder rungs 304 are located at the same height and at specific intervals apart from each other.

As illustrated in FIGS. 16-19, the cable cleat system 320 includes a mounting bracket assembly 322, a floating support bracket 350 and a metal locking tie 360. The mounting bracket assembly 322 includes a bracket body 324, a mounting bolt 326, a mounting hex nut 328, and a stop screw 330. The bracket body 324 includes a horizontal beam 332, a vertical member 336, and a retaining flange 340. The vertical member 336 has a hole 338 that receives the mounting bolt 326 to attach the bracket body 324 to the perforated ladder rung 304. The bracket body 324 is secured in place with the mounting hex nut 328.

Figure 18:
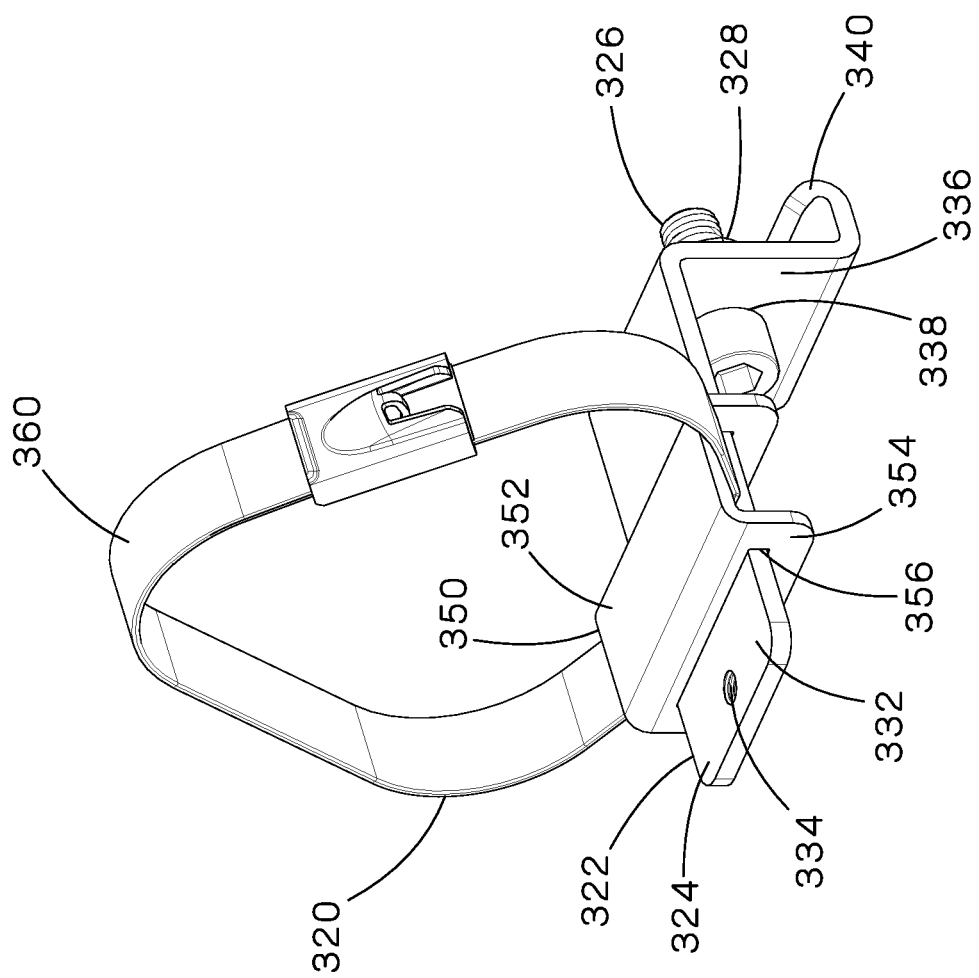
FIG. 18 is a perspective view of the cable cleat of FIG. 15.
Figure 19:
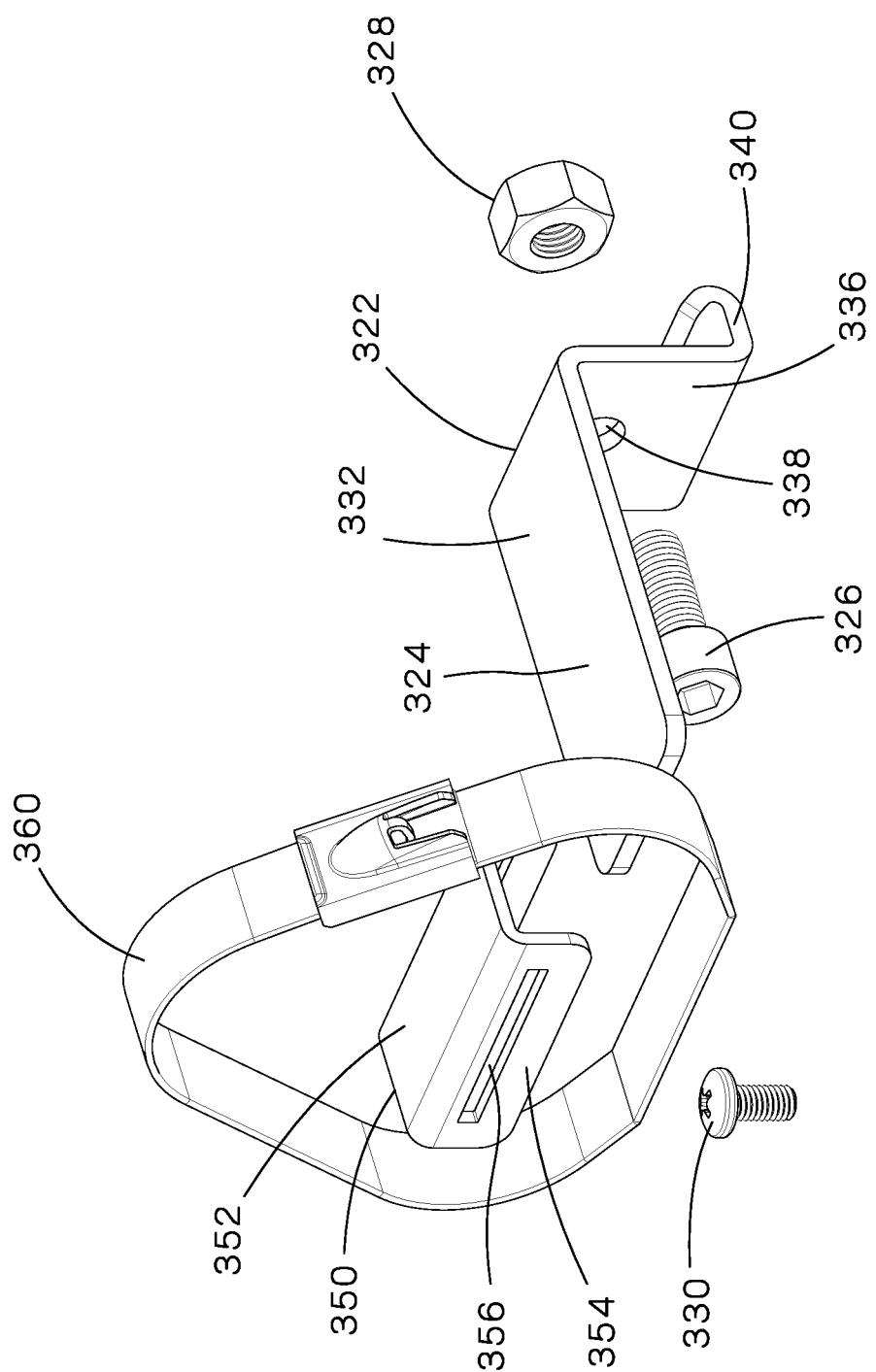
FIG. 19 is an exploded view of the cable cleat of FIG. 18.
Figure 20:
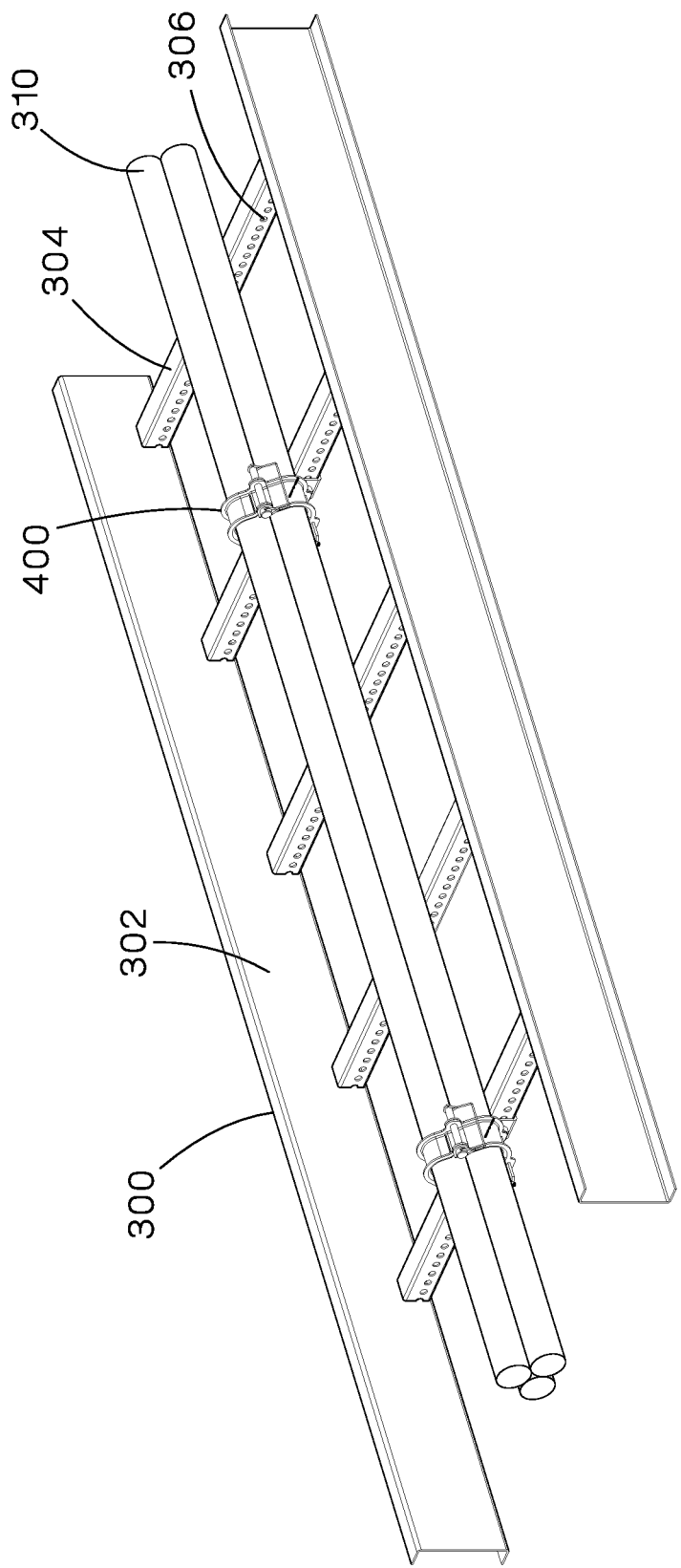
FIG. 20 is a perspective view of an alternative ladder rack and cable cleat system.

The horizontal beam 332 includes a threaded hole 334 at a first end for receiving the stop screw 330. The horizontal beam 332 accommodates the floating support bracket 350. The floating support bracket 350 includes a rectangular base 352 with two flanges 354. Each of the flanges 354 includes a slot 356 or elongated opening that are aligned with each other. As illustrated in FIG. 18, the horizontal beam 332 is positioned through the aligned slots or elongated openings 356 of the floating support bracket 350. The stop screw 330 prevents the floating support bracket 350 from sliding off of the horizontal beam 332. The floating support bracket 350 upholds the cables 310 and receives the metal locking tie 360.

The retaining flange 340 extends from the vertical member 336. The retaining flange 340 engages the ladder rung 304 and prevents the bracket body 324 from being tilted or twisted away when the cables 310 are short circuited.

The metal locking tie 360 is thread between the floating support bracket 350 and the horizontal beam 332 and wrapped around the cables 310. The metal locking tie 360 can be tightened to accommodate various size cables. The floating support bracket 350 and attached metal locking tie 360 slide along the horizontal beam 332, as necessary, to allow thermal expansion and contraction of the cables 310.

FIGS. 20-26 illustrate the ladder rack 300 and an alternative cable cleat system 400 that allows for the thermal expansion and contraction of cables secured to a ladder rack. The alternative cable cleat system 400 is used with the ladder rack 300 having ladder rack side rails 302 and a plurality of perforated ladder rungs 304 positioned between the ladder rack side rails 302. The perforated ladder rungs 304 include aligned holes 306. The perforated ladder rungs 304 are located at the same height at specific intervals apart from each other.

The cable cleat system 400 includes a mounting bracket assembly 402 and a cable cleat 430. The mounting bracket assembly 402 includes a bracket body 404, a mounting bolt 406, a mounting hex nut 408, and a stop screw 410. The bracket body 404 includes a horizontal beam 412, a vertical member 414, and a retaining flange 418. The vertical member 414 has a hole 416 that receives the mounting bolt 406 to secure the bracket body 404 to the perforated ladder rung 304. The bracket body 404 is secured in place with the mounting hex nut 408. In contrast to the mounting bracket 322 illustrated in FIG. 17, the mounting bolt 406 and the mounting hex nut 408 are installed in reversed position with the head of the mounting bolt 406 positioned between the sides of the perforated ladder rung 304 and the mounting hex nut 408 positioned below the horizontal beam 412.

The horizontal beam 412 includes a threaded hole 413 at a first end for receiving the stop screw 410. The retaining flange 418 extends from the vertical member 414. The retaining flange 418 engages the ladder rung 304 and prevents the bracket body 404 from being tilted or twisted away when the cables 310 are short circuited.

As illustrated in FIGS. 21-24, the cable cleat 430 includes a base 432, a cover 452 and two pins 466, 472 with keeper wires 470, 476, respectively. Each of the pins has a different function. The cable cleat hinge pin 466 acts as a hinge that pivotally connects the second end 440 of the base 432 and the first end 454 of the cover 452. The cable cleat locking pin 472 locks the second end 460 of the cover 452 to the first end 434 of the base 432 to secure the cable cleat 430 on the cables 310. The keeper wires 470, 476 are inserted in holes 468, 474 in the cable cleat hinge pin 466 and the cable cleat locking pin 472, respectively. The keeper wires 470, 476 protect against vibration and prevent the cable cleat hinge pin 466 and the cable cleat locking pin 472, respectively, from accidentally sliding out of position.

Figure 21:
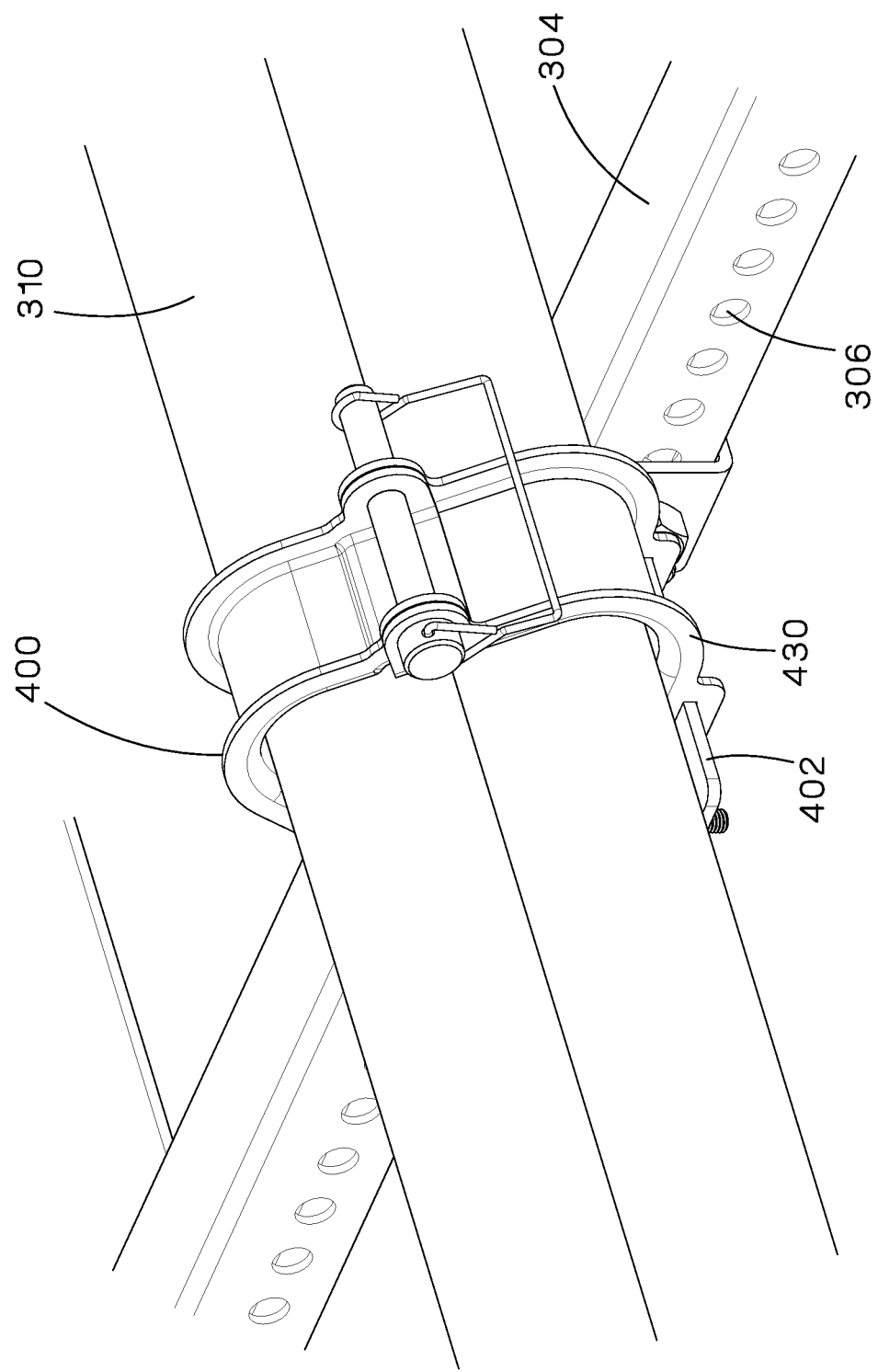
FIG. 21 is a perspective view of a cable cleat installed on a perforated ladder rung of FIG. 20.
Figure 22:
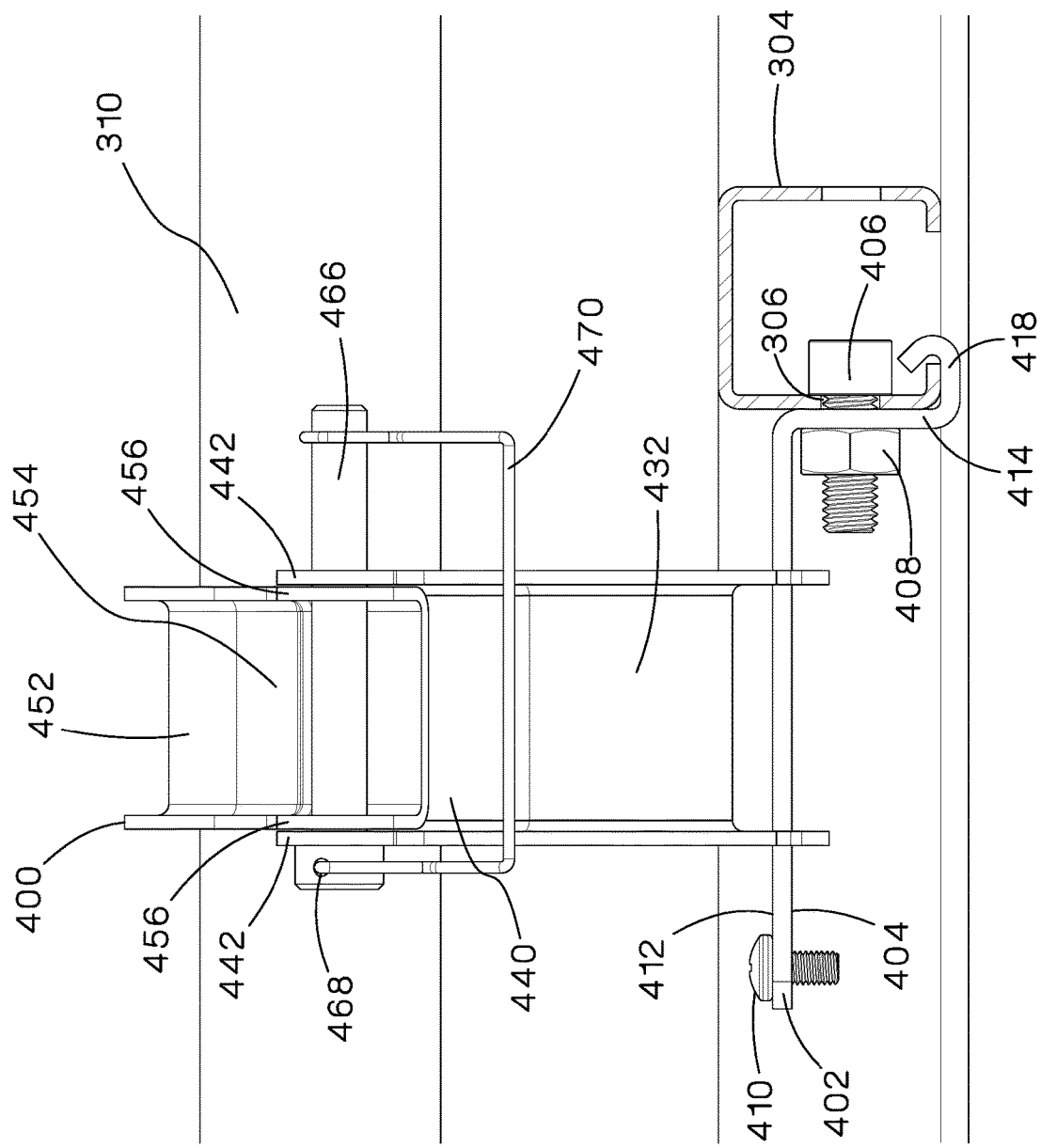
FIG. 22 is a right side view of the ladder rack and cable cleat system of FIG. 20 with a ladder rack side rail removed.
Figure 23:
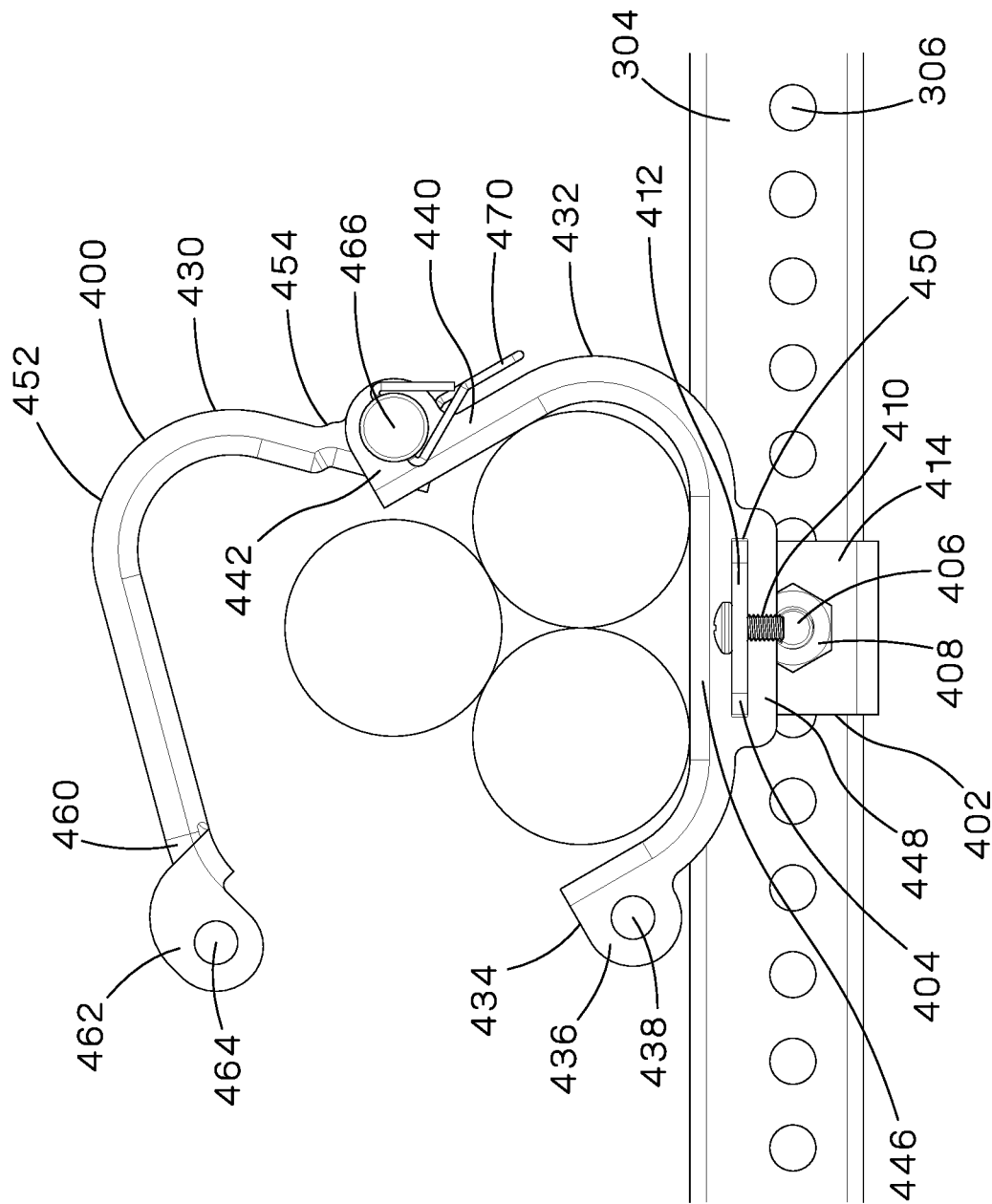
FIG. 23 is a front view of the cable cleat of FIG. 21 partially installed around a bundle.

The first end 434 of the base 432 has two flanges 436 with center holes 438. As illustrated in FIGS. 21 and 22, the holes 438 are aligned to receive the cable cleat locking pin 472. The second end 440 of the base 432 also has two flanges 442 with center holes 444. The holes 444 are aligned to receive the cable cleat hinge pin 466. The bottom flat portion 446 of the base 432 includes flanges 448 with aligned elongated slots 450. The elongated slots 450 are designed to receive the horizontal beam 412 of the bracket body 404. The stop screw 410 prevents the flat bottom portion 446 of the cable cleat 430 from sliding off of the horizontal beam 412. The bottom flat portion 446 of the base 432 acts as a floating support enabling the cable cleat 430 to slide along the horizontal beam 412, when necessary, to accommodate the expansion and contraction of cables 310.

Figure 24:
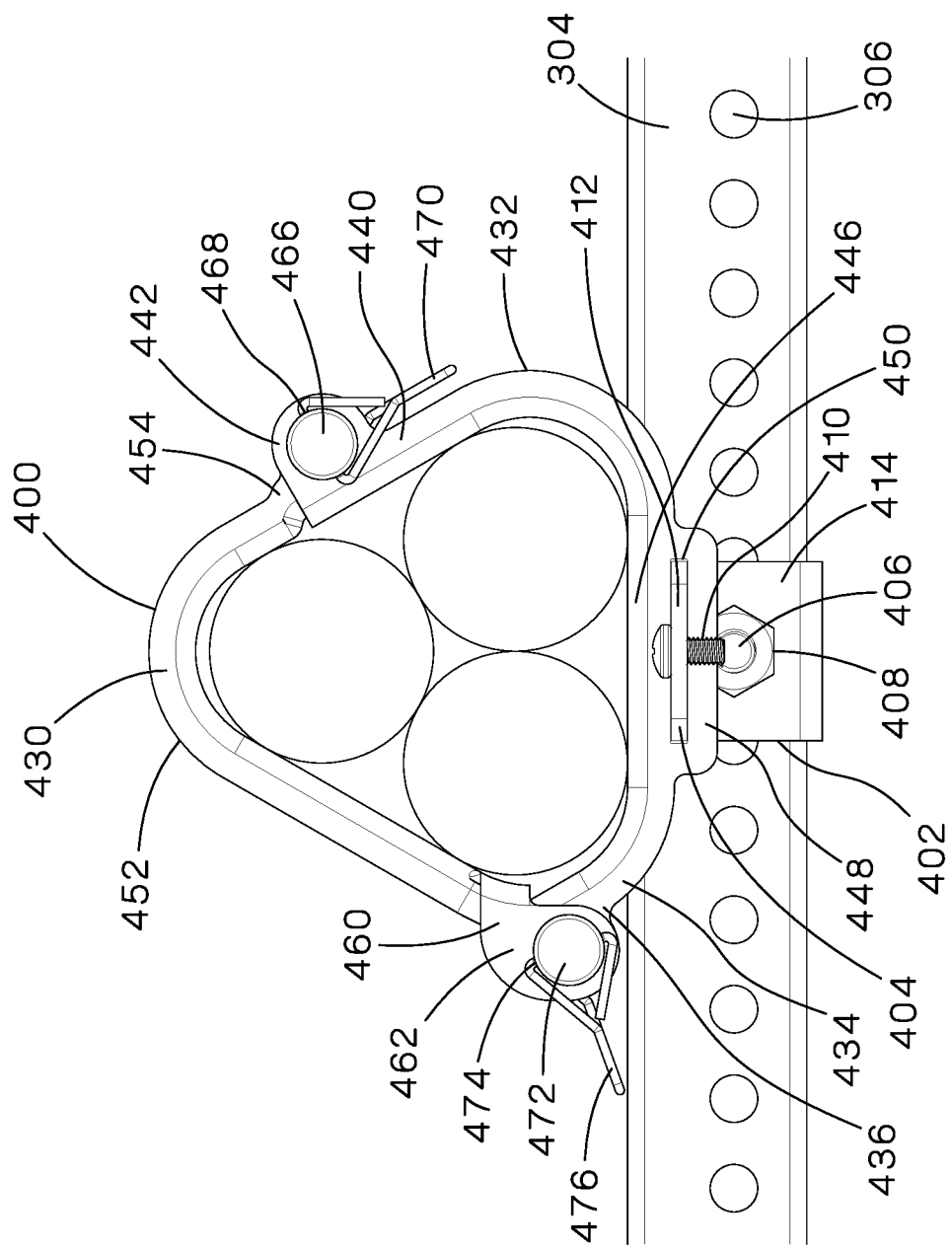
FIG. 24 is a front view of the cable cleat of FIG. 23 installed around a bundle.

The first end 454 of the cover 452 includes flanges 456 with aligned holes 458 for receiving the cable cleat hinge pin 466. As illustrated in FIG. 21, the first end 454 of the cover 452 is positioned between the flanges 442 at the second end 440 of the base 432 such that holes 444, 458 in the flanges 442, 456, respectively, are aligned to accommodate the cable cleat hinge pin 466. The second end 460 of the cover 452 includes flanges 462 with aligned centered holes 464 for receiving the cable cleat locking pin 472. As illustrated in FIG. 24, the first end 434 of the base 432 is positioned between the flanges 462 of the second end 460 of the cover 452 such that the holes 438, 464 in the flanges 436, 462, respectively, are aligned to accommodate the cable cleat locking pin 472.

After the cable cleat base 432 is slid onto the horizontal beam 412 and cables 310 on the horizontal beam 412, the cable cleat cover 452 is pivoted downward to confine the cables 310. Once the cable cleat 430 is closed over the cables 310, the cable cleat locking pin 472 is inserted through the aligned holes 464 in the flanges 462 at the second end 460 of the cable cleat cover 452 and the holes 438 in the flanges 436 at the first end 434 of the cable cleat base 432.

Figure 25:
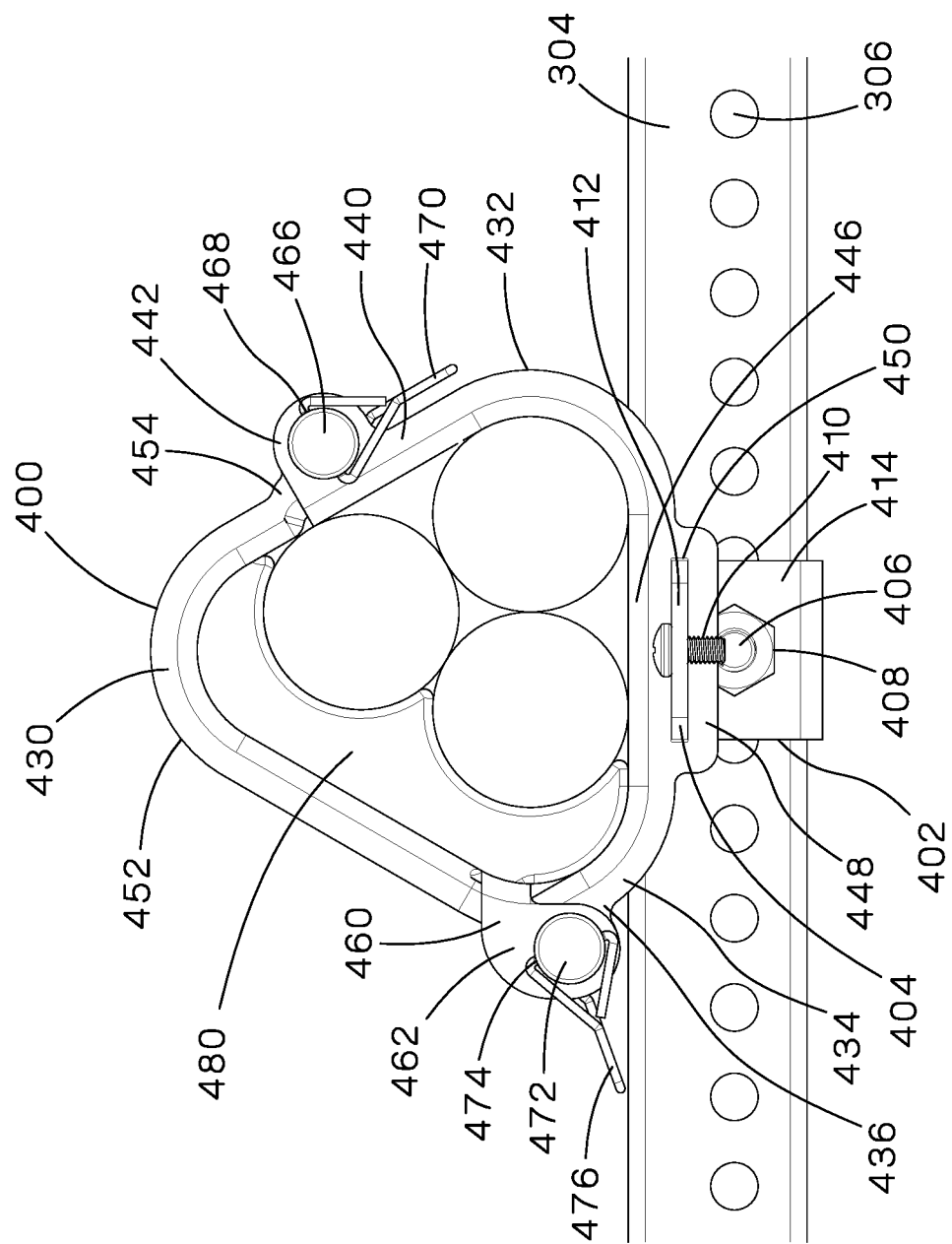
FIG. 25 is a front view of the cable cleat of FIG. 20 with a molded insert installed around a small bundle.
Figure 26:
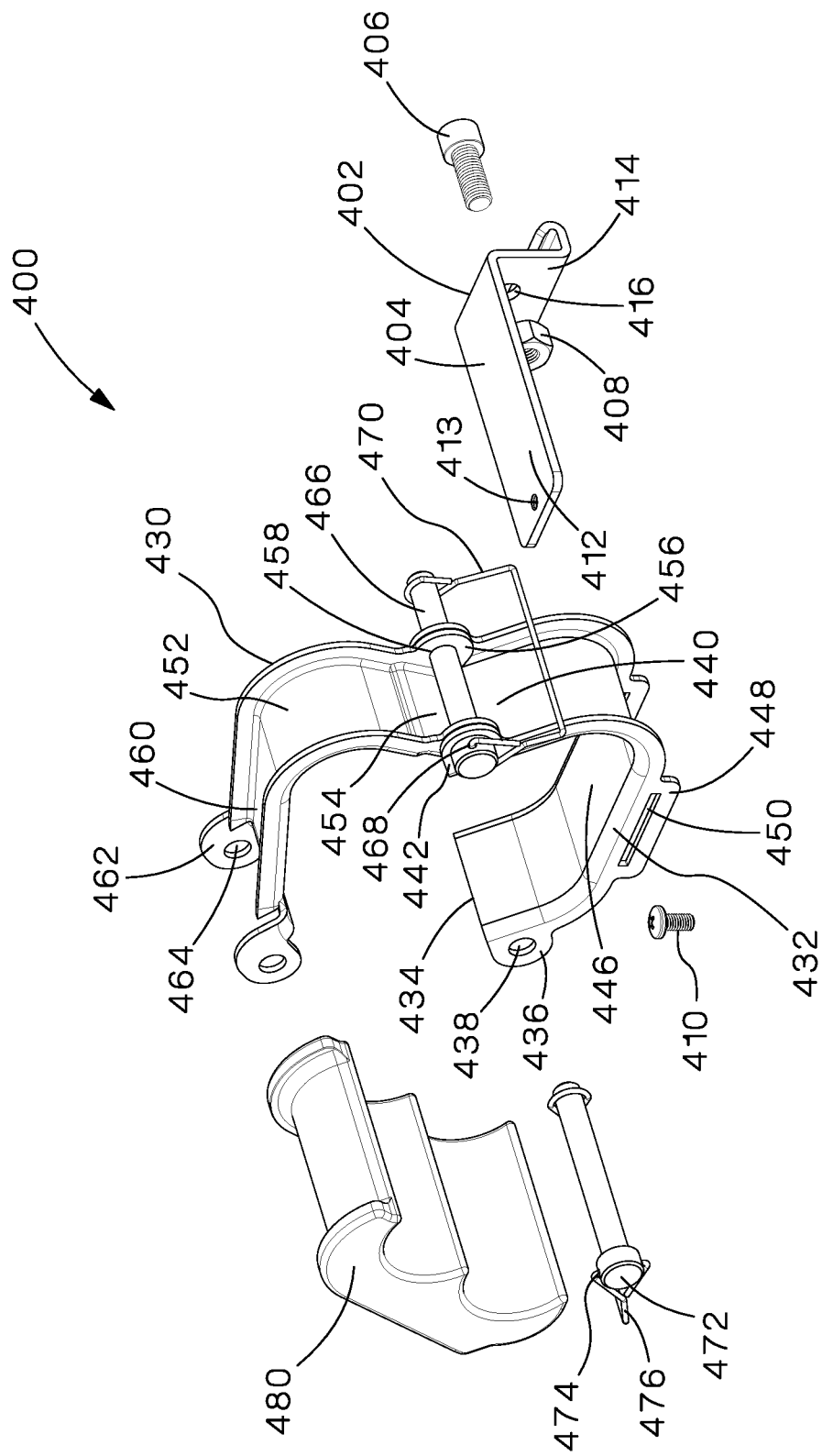
FIG. 26 is an exploded view of the cable cleat of FIG. 25.

As illustrated in FIGS. 25 and 26, the cable cleat 430 may be used with different size cables 490, if desired. A molded insert 480 is positioned over the cables 490 prior to the cable cleat cover 452 pivoting downward to secure the cables 490. The molded insert 480 enables the cable cleat assembly 400 to secure a range of cable sizes. It is contemplated that the molded insert 480 illustrated in FIGS. 25 and 26 may also be used with the cable cleat assemblies illustrated and described with respect to FIGS. 1-14 to accommodate different size cables secured to the ladder rack.

The cable cleat systems described above provide an improved connection of the cables on the ladder racks to enable the cables to expand and contract without damaging the cables or the ladder rack.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable cleat system for securing cables to a ladder rack, the cable cleat system comprising:
   a mounting bracket assembly having a bracket body; and
   a cable cleat slidably mounted to the bracket body, wherein the cable cleat having a base and a cover hingedly attached to the base,
   wherein the base of the cable cleat includes a bottom flat portion with two flanges, each flange includes a slot, wherein the flanges extend downwardly from the base and the slots are aligned with each other; and wherein the bracket body is positioned through the aligned slots of the base of the cable cleat for enabling the cable cleat to slide along the bracket body to accommodate expansion and contraction of the cables,
   whereby the mounting bracket assembly is secured to a ladder rung of the ladder rack and the cable cleat confines the cables to secure the cables to the ladder rack.

2. The cable cleat system of claim 1, wherein the bracket body having a horizontal beam, a vertical member and a retaining flange extending from the vertical member, whereby the retaining flange engages the ladder rung to prevent the bracket body from twisting.

3. The cable cleat system of claim 2, wherein the horizontal beam includes a first end with a threaded hole for receiving a fastener, wherein the fastener prevents the cable cleat from sliding off of the horizontal beam.

4. The cable cleat system of claim 2, wherein the vertical member having a hole for receiving a fastener to attach the bracket body to the ladder rung.

5. The cable cleat system of claim 1, wherein the base of the cable cleat includes a first end and a second end and the cover of the cable cleat includes a first end and a second end.

6. The cable cleat system of claim 5, wherein the cable cleat includes a hinge pin pivotally connecting the second end of the base and the first end of the cover; and a locking pin locking the second end of the cover to the first end of the base.

7. The cable cleat system of claim 6, wherein the cable cleat includes a first keeper wire inserted in a hole in the hinge pin and a second keeper wire inserted in a hole in the locking pin for protecting the hinge pin and the locking pin against vibration and sliding out of position.

8. The cable cleat system of claim 1, further comprising an insert positioned between the base and the cover of the cable cleat for accommodating multiple cable sizes.

9. A cable cleat system for securing cables to a ladder rack, the cable cleat system comprising:
   a mounting bracket assembly having a bracket body; and
   a cable cleat slidably mounted to the bracket body, wherein the cable cleat having a base and a cover hingedly attached to the base,
   wherein the base of the cable cleat includes a first end and a second end and the cover of the cable cleat includes a first end and a second end;
   wherein the cable cleat includes a hinge pin pivotally connecting the second end of the base and the first end of the cover; and a locking pin locking the second end of the cover to the first end of the base; and
   wherein the first and second ends of the base include flanges with aligned holes and the first and second ends of the cover include flanges with aligned holes; wherein the first end of the cover is positioned between the flanges at the second end of the base with the holes in the flanges being aligned to receive the hinge pin; and the first end of the base is positioned between the flanges of the second end of the cover with the holes in the flanges being aligned to receive the locking pin;
   whereby the mounting bracket assembly is secured to a ladder rung of the ladder rack and the cable cleat confines the cables to secure the cables to the ladder rack.

* * * * *